(12) United States Patent
Zhang et al.

(10) Patent No.: US 11,284,084 B1
(45) Date of Patent: Mar. 22, 2022

(54) CONSTRAINTS ON MODEL-BASED RESHAPING IN VIDEO PROCESSING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/357,093

(22) Filed: Jun. 24, 2021

Related U.S. Application Data

(63) Continuation of application No. PCT/CN2020/078388, filed on Mar. 9, 2020.

(51) Int. Cl.
*H04N 19/132* (2014.01)
*H04N 19/30* (2014.01)
(Continued)

(52) U.S. Cl.
CPC ......... *H04N 19/132* (2014.11); *H04N 19/172* (2014.11); *H04N 19/186* (2014.11); *H04N 19/30* (2014.11); *H04N 19/70* (2014.11)

(58) Field of Classification Search
CPC .. H04N 19/132; H04N 19/176; H04N 19/186; H04N 19/30; H04N 19/70
See application file for complete search history.

(56) References Cited

U.S. PATENT DOCUMENTS

| 10,609,395 B2 | 3/2020 | Kerofsky et al. |
| 10,652,588 B2 | 5/2020 | Kerofsky et al. |

(Continued)

FOREIGN PATENT DOCUMENTS

| CN | 107439012 A | 12/2017 |
| WO | 2016132145 A1 | 8/2016 |

(Continued)

OTHER PUBLICATIONS

Non Final Office Action from U.S. Appl. No. 17/357,166 dated Oct. 5, 2021.

(Continued)

*Primary Examiner* — Jae N Noh
(74) *Attorney, Agent, or Firm* — Perkins Coie LLP

(57) ABSTRACT

A video processing method is provided, including: performing a conversion between a coded representation of a video including one or more video regions and the video, wherein the coded representation includes reshaping model information applicable for in loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information includes a parameter set that includes a syntax element specifying a difference between an allowed maximum bin index and a maximum bin index to be used in the reconstruction, and wherein the parameter is in a range.

20 Claims, 33 Drawing Sheets

(51) Int. Cl.
*H04N 19/176* (2014.01)
*H04N 19/186* (2014.01)
*H04N 19/172* (2014.01)
*H04N 19/70* (2014.01)

(56) References Cited

U.S. PATENT DOCUMENTS

| | | |
|---|---|---|
| 2011/0243232 A1 | 10/2011 | Alshina et al. |
| 2019/0116376 A1 | 4/2019 | Chen et al. |
| 2019/0320191 A1* | 10/2019 | Song ............ H04N 19/136 |
| 2019/0349607 A1* | 11/2019 | Kadu ............ H04N 19/117 |
| 2020/0252619 A1 | 8/2020 | Zhang et al. |
| 2020/0267392 A1* | 8/2020 | Lu ............ H04N 19/174 |
| 2020/0288173 A1* | 9/2020 | Ye ............ H04N 19/186 |
| 2020/0359051 A1 | 11/2020 | Zhang et al. |
| 2020/0382771 A1 | 12/2020 | Liu et al. |
| 2020/0396453 A1 | 12/2020 | Zhang et al. |
| 2021/0029361 A1* | 1/2021 | Lu ............ H04N 19/186 |
| 2021/0092396 A1 | 3/2021 | Zhang et al. |
| 2021/0211738 A1 | 7/2021 | Yin et al. |
| 2021/0297679 A1 | 9/2021 | Zhang et al. |
| 2021/0321140 A1 | 10/2021 | Zhang et al. |
| 2021/0329273 A1 | 10/2021 | Rusanovskyy et al. |
| 2021/0400257 A1 | 12/2021 | Zhao et al. |
| 2021/0409753 A1 | 12/2021 | Rufitskiy et al. |

FOREIGN PATENT DOCUMENTS

| | | |
|---|---|---|
| WO | 2016164235 A1 | 10/2016 |
| WO | 2017144881 A1 | 8/2017 |
| WO | 2017158236 A2 | 9/2017 |
| WO | 2019006300 A1 | 1/2019 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Separate List for Sub-Block Merge Candidates (Test 4.2.8)," Joint Video Experts Team (JVEI) of ITU-T SG 16 WP 3 and ISO/IEC JTC 1/SC 29/WG 11, 12th Meeting, Macao, CN, Oct. 3-12, 2018, document JVET-L0369, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Francois et al. "CE12-Related: Block-Based In-Loop Luma Reshaping," Joint Video Experts Team (JVET) of ITU-T SG 16WP3 and ISO/IEC JTC 1/SC 29/WG 11, 13th Meeting, Marrakech, MA Jan. 9-18, 2019, document JVET-M0109,2019.

Francois et al. "CE12-Related: In-Loop Luma Reshaping with Approximate Inverse Mapping Function," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0640, 2019.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337,2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019.

Pu et al. "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0246, 2018.

Rasch et al. "CE10: Uniform Directional Diffusion Filters for Video Coding," Joint Video Experts Team (JVET) of ITU-T SG 16 WP 3 and ISO/IEC JTC 1/Sc 29/WG 11, 12th Meeting, Macao, CN, Oct. 3-12, 2018, document JVET-L0157, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Rusanovskyy et al. "CE14: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, 3-12, Oct. 2018, document JVET-L0406, 2018.

Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

Stepin et al. "CE2 Related: Hadamard Transform Domain Filter," Joint Video Expters Team (JVET) of ITU-T SG 16 and ISO/IEC JTC 1/SC 29/WG 11, 11th Meeting, Ljubljana, SI, Jul. 10-18, 2018, document JVET-K0068, 2018.

Wang et al. "AHG17: On Header Parameter Set (HPS)," Joint Video Experts Team (JVET) of ITU-T SG 16 WP 3 and SO/IEC JTC 1/SC 29/WG 11, 13th Meeting, Marrakech, MA, Jan. 9-18, 2019, document JVET-M0132, 2019.

JEM-7.0: https://jvet.hhi.fraunhofer.de/svn/svn_HMJEMSoftware/tags/ HM-16.6-JEM-7.0.

https://vcgit.hhi.fraunhofer.de/jvet/VVCSoftware_VTM/tags/VTM-2.1.

International Search Report and Written Opinion from International Patent Application No. PCT/CN2020/078385 dated Jun. 4, 2020 (10 pages).

International Search Report and Written Opinion from International Patent Application No. PCT/CN2020/078388 dated May 29, 2020 (10 pages).

International Search Report and Written Opinion from International Patent Application No. PCT/CN2020/078393 dated Jun. 5, 2020 (9 pages).

Final Office Action from U.S. Appl. No. 17/357,166 dated Jan. 28, 2022.

* cited by examiner

Candidate positions for temporal merge candidate, C0 and C1

Illustration of motion vector scaling for spatial motion vector candidate

ATMVP motion prediction for a CU

Example of one CU with four sub-blocks (A-D) and its neighbouring blocks (a-d)

6 parameter affine 4 parameter affine

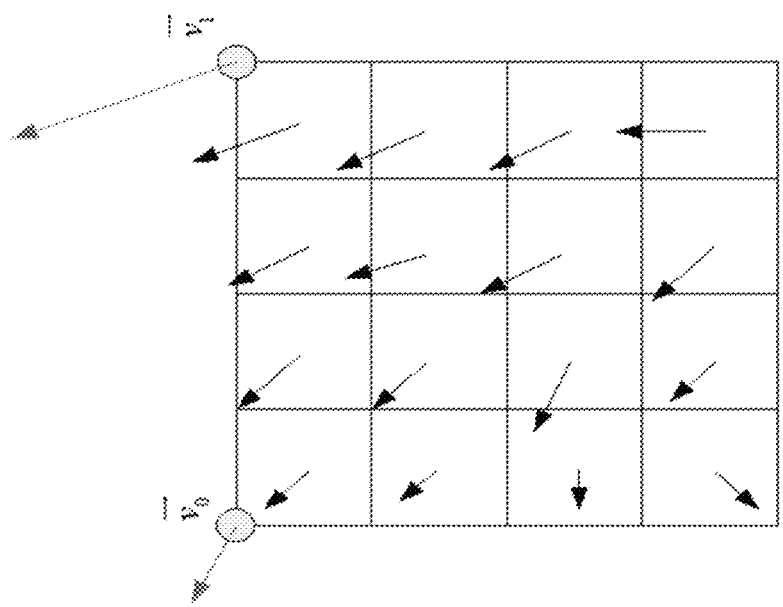

Five neighboring blocks

Candidates for AF_MERGE
CPMV predictor derivation

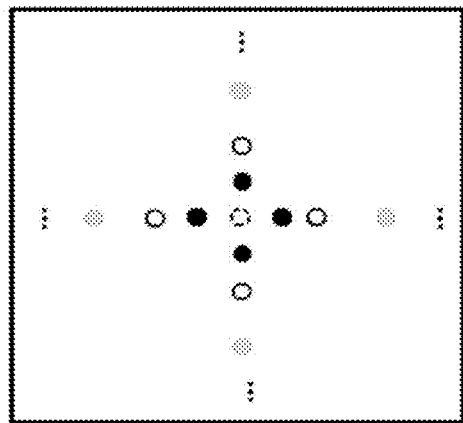
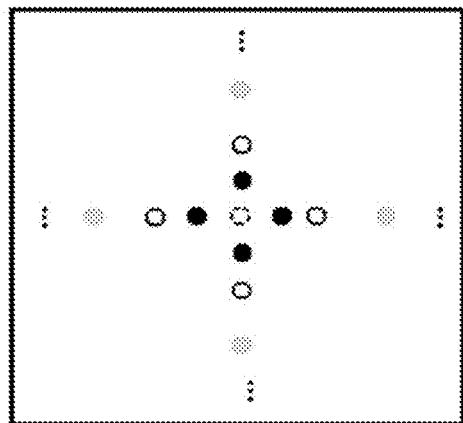
FIG. 21

Flowchart of decoding flow with reshaping.

Windows covering two samples utilized in weight calculation.

Scan pattern. A – current pixel, BCD – surrounding pixels

CONSTRAINTS ON MODEL-BASED RESHAPING IN VIDEO PROCESSING

CROSS REFERENCE TO RELATED APPLICATIONS

This application is a continuation of International Application No. PCT/CN2020/078388, filed on Mar. 9, 2020, which claims the priority to and benefit of International Patent Application No. PCT/CN2019/077429, filed on Mar. 8, 2019. All the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to quantization step signaling and interactions of block-based in-loop reshaping with other tools in video coding. It may be applied to the existing video coding standard like HEVC, or the standard (Versatile Video Coding) to be finalized. It may be also applicable to future video coding standards or video codec.

In one representative aspect, the disclosed technology may be used to provide a method for video processing. This method includes: determining, for a conversion between multiple video units of a video region of a video and a coded representation of the multiple video units, reshaping model information that is commonly shared by the multiple video units; and performing a conversion between a coded representation of the video and the video, wherein, the reshaping model information provides information for constructing video samples in a first domain and a second domain and/or scaling chroma residue of a chroma video unit.

In another representative aspect, the disclosed technology may be used to provide a method for video processing. This method includes determining, for a conversion between a coded representation of a video comprising one more video regions and the video, a value of a variable in reshaping model information as a function of a bit-depth of the video, and performing the conversion based on the determining, wherein the reshaping information is applicable for in-loop reshaping (ILR) of some of the one or more video regions, and wherein the reshaping information provides information for a reconstruction of a video unit of a video region based on a representation in a first domain and a second domain and/or scaling chroma residue of a chroma video unit.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation of the video unit in a first domain and a second domain and/or scaling chroma residue of a chroma video unit, and wherein the reshaping model information has been initialized based on an initialization rule.

In another representative aspect, the disclosed technology may be used to provide a method for video processing. This method includes determining, for a conversion between a coded representation of a video comprising one or more video regions and the video, whether to enable or disable an in loop reshaping (ILR); and performing the conversion based on the determining, and wherein the coded representation includes reshaping model information applicable for the ILR of some of one or more video regions, and wherein the reshaping model information provides information for a reconstruction of a video region based on a first domain and a second domain and/or scaling chroma residue of a chroma video unit, and wherein the determining determines to disable the ILR in a case that the reshaping model information is not initialized.

In another representative aspect, the disclosed technology may be used to provide a method for video processing. This method includes performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a first domain and a second domain and/or scaling chroma residue of a chroma video unit, wherein the reshaping model information is included in the coded representation only if the video region is coded using a specific coding type.

In another representative aspect, the disclosed technology may be used to provide a method for video processing. This method includes determining, for a conversion between a first video region of a video and a coded representation of the first video region, whether reshaping information from a second video region is usable for the conversion based on a rule; and performing the conversion according to the determining.

In another representative aspect, the disclosed technology may be used to provide a method for video processing. This method includes performing a conversion between a video region of a video and a coded representation of the video region such that the current video region is coded using an intra coding, wherein the coded representation conforms to a format rule that specifies to reshaping model information in the coded representation conditionally based on a value of a flag in the coded representation at a video region level.

In another representative aspect, the disclosed technology may be used to provide a method for video processing. This method includes performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that comprises a syntax element specifying a difference between an allowed maximum bin index and a maximum bin index to be used in the reconstruction, and wherein the parameter is in a range.

In another representative aspect, the disclosed technology may be used to provide a method for video processing. This method includes performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a representation in a first domain and a second domain and/or scaling chroma residue of a chroma video unit, wherein the reshaping model information comprises a parameter set that comprises a maximum bin index to be used in the reconstruction, and wherein the maximum bin index is derived as a first value equal to a sum of a minimum bin index to be used in the reconstruction and a syntax element that is an unsigned integer and signaled after the minimum bin index.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a first syntax element that derives a number of bits used to represent a second syntax element specifying an absolute delta codeword value from a corresponding bin, and wherein the first syntax element has a value smaller than a threshold.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes an i-th parameter that represents a slope of an i-th bin used in the ILR and has a value based on an (i−1)th parameter, i being a positive integer.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and, wherein the reshaping model information used for the ILR comprises a parameter set that includes reshape_model_bin_delta_sign_CW[i] that is not signaled and RspDeltaCW[i]=reshape_model_bin_delta_abs_CW[i] is always a positive number.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a parameter, invAvgLuma, for using luma values for the scaling depending on a color format of the video region.

In another representative aspect, the disclosed technology may be used to provide a method for video processing. This method includes performing a conversion between a current video block of a video and a coded representation of the video, wherein the conversion includes a picture inverse mapping process to transform reconstructed picture luma samples to modified reconstructed picture luma samples, wherein the picture inverse mapping process includes clipping in which an upper bound and a lower bound are set separately from each other.

In another representative aspect, the disclosed technology may be used to provide a method for video processing. This method includes performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a pivot quantity constrained such that Pivot[i]<=T.

In another representative aspect, the disclosed technology may be used to provide a method for video processing. This method includes performing a conversion between a representation of a video comprising one or more video regions and the video, wherein the coded representation includes information applicable for an in loop reshaping (ILR) and provides parameters for a reconstruction of a video unit of a video region based on a representation in a first domain and a second domain and/or scaling chroma residue of a chroma video unit, and wherein a chroma quantization parameter (QP) has an offset whose value is derived for each block or transform unit.

In another representative aspect, the disclosed technology may be used to provide a method for video processing. This method includes performing a conversion between a representation of a video comprising one or more video regions and the video, wherein the coded representation includes information applicable for an in loop reshaping (ILR) and provides parameters for a reconstruction of a video unit of a video region based on a representation in a first domain and a second domain and/or scaling chroma residue of a chroma video unit, and wherein a luma quantization parameter (QP) has an offset whose value is derived for each block or transform unit.

One or more of the above-disclosed methods can be an encoder-side implementation or a decoder-side implementation.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 14 shows an example of an affine motion vector field per sub-block.

FIG. 21 shows an example of a UMVE search point.

DETAILED DESCRIPTION

1. Video Coding in HEVC/H.265

Figure 1:
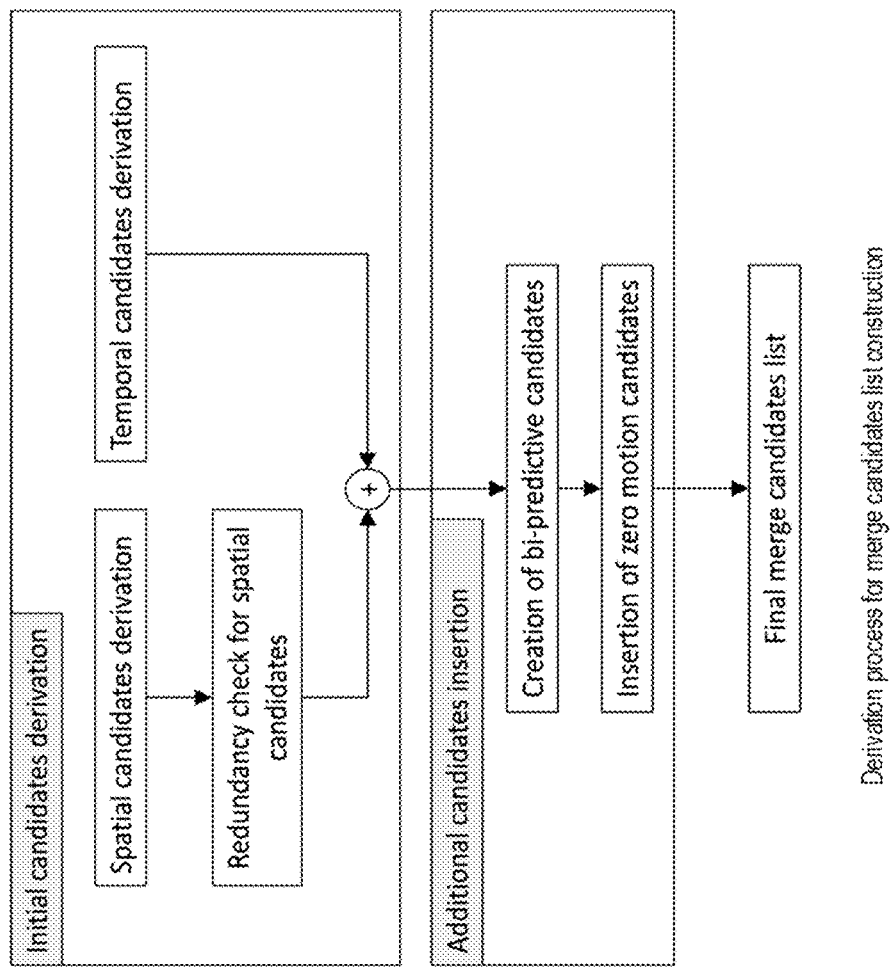
FIG. 1 shows an example of constructing a merge candidate list.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. The latest version of VVC draft, i.e., Versatile Video Coding (Draft 2) could be found at http://phenix.it-sudparis.eu/jvet/doc_end_user/documents/11_Ljubljana/wg11/JVET-K1001-v7.zip The latest reference software of VVC, named VTM, could be found at: https://vcgit.hhi.fraunhofer.de/jvet/VVCSoftware_VTM/tags/VTM-2.1

2.1. Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as "uni-prediction." Uni-prediction is available both for P-slices and B-slices.

When signaling indicates that both of the reference picture lists are to be used, the PU is produced from two blocks of samples. This is referred to as "bi-prediction." Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2. Merge Mode

2.1.2.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
  Step 1.1: Spatial candidates derivation
  Step 1.2: Redundancy check for spatial candidates
  Step 1.3: Temporal candidates derivation
Step 2: Additional candidates insertion
  Step 2.1: Creation of bi-predictive candidates
  Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 2:
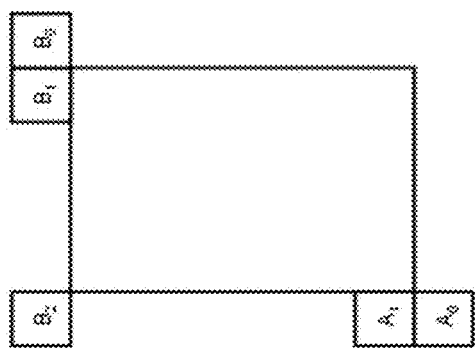
FIG. 2 shows an example of positions of spatial candidates.
Figure 3:
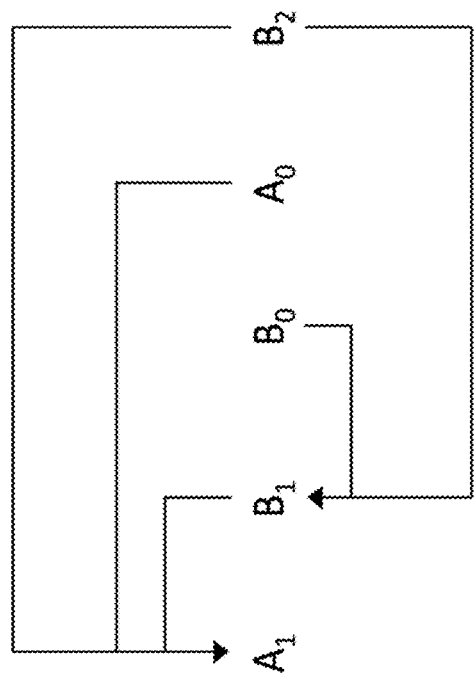
FIG. 3 shows an example of candidate pairs subject to a redundancy check of spatial merge candidates.
Figure 4:
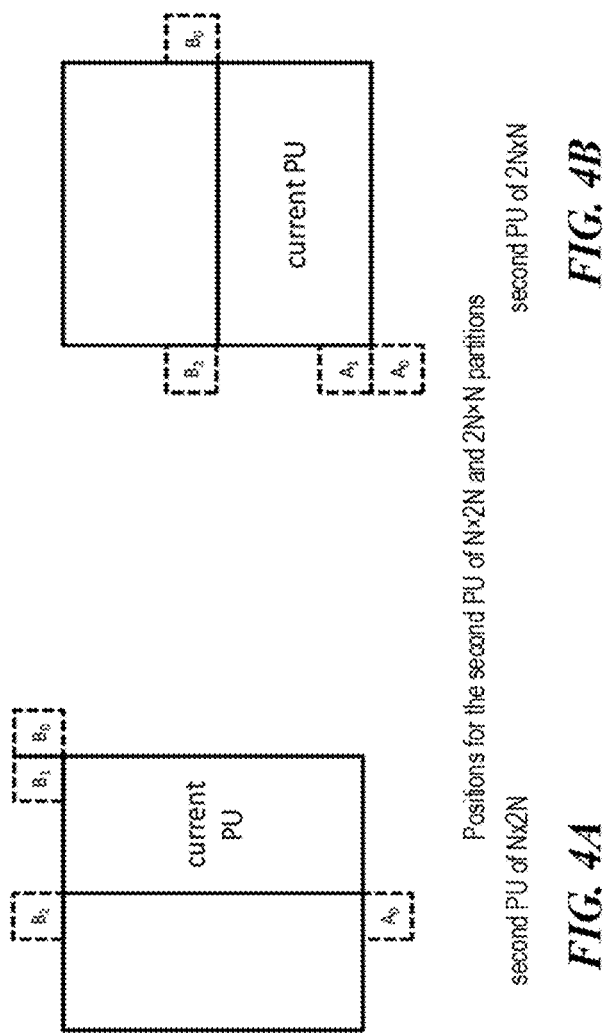
FIGS. 4A and 4B show examples of the position of a second prediction unit (PU) based on the size and shape of the current block.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the cases N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3. Temporal Candidates Derivation

Figure 5:
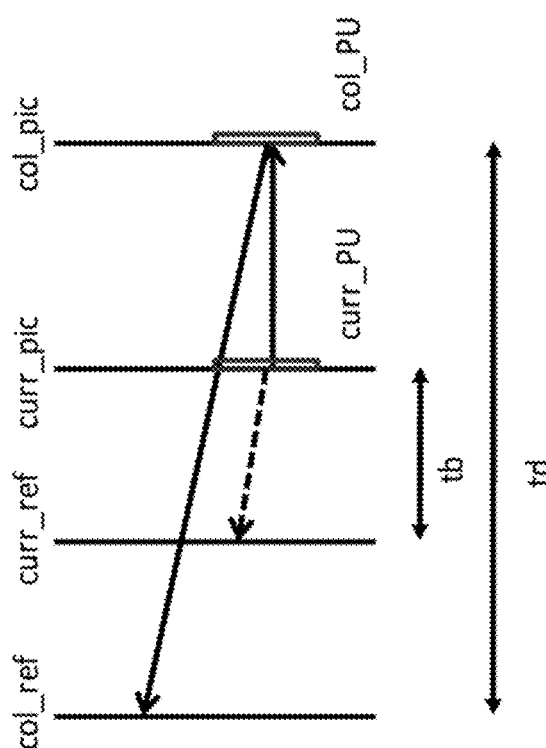
FIG. 5 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
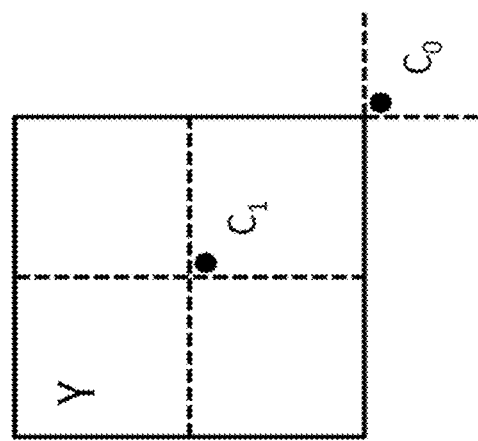
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU a/k/a LCU, largest coding unit) row, position $C_1$ is used. Otherwise, position $C_0$ is used in the derivation of the temporal merge candidate.

2.1.2.4. Additional Candidates Insertion

Figure 7:
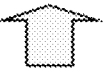
FIG. 7 shows an example of generating a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (e.g., see FIG. 8). In the following sections, details about derivation process of motion vector prediction candidate are provided.

2.1.3.1. Derivation of AMVP Candidates

Figure 8:
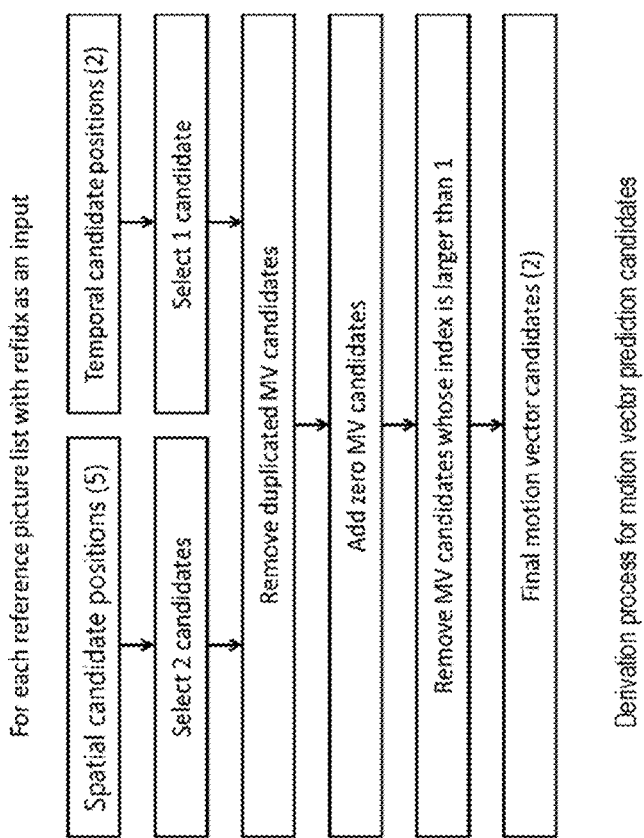
FIG. 8 shows an example of constructing motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
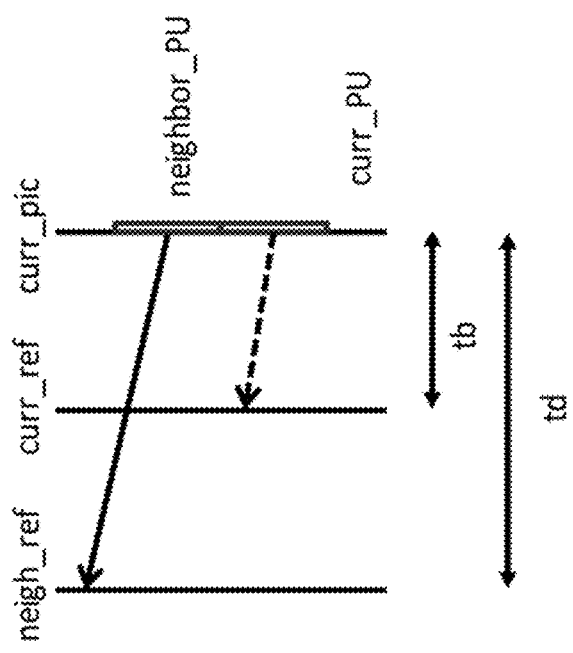
FIG. 9 shows an example of motion vector scaling for spatial motion vector candidates.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2. Sub-CU Based Motion Vector Prediction Methods in JEM

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1. Alternative Temporal Motion Vector Prediction

Figure 10:
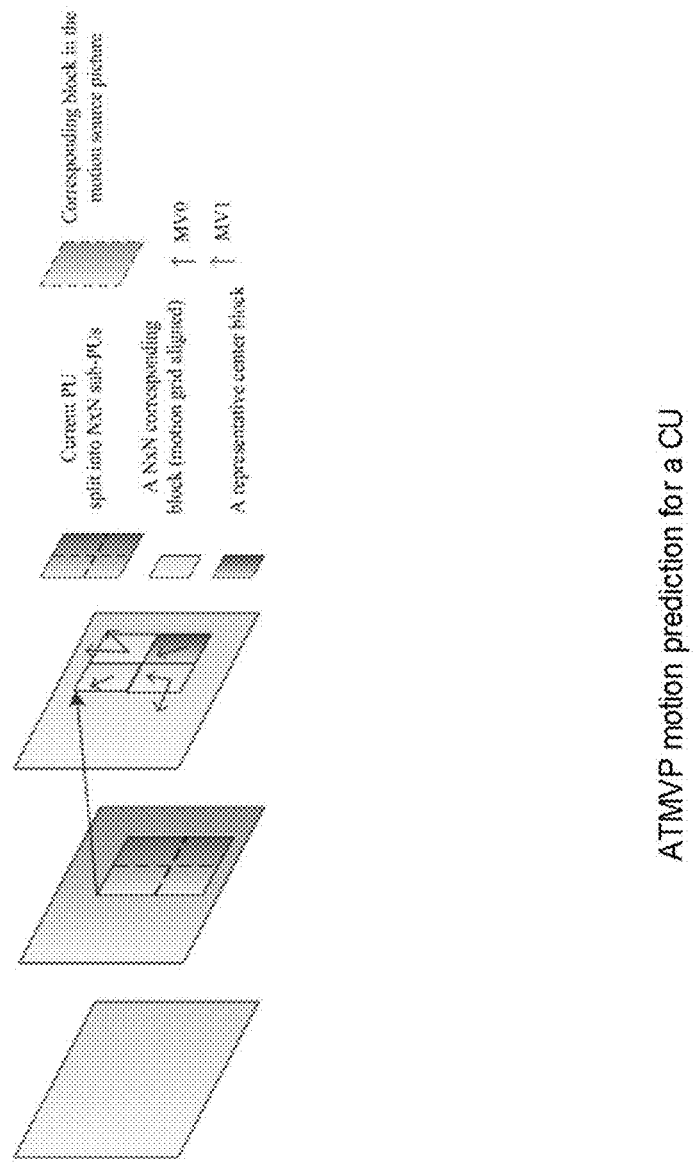
FIG. 10 shows an example of alternative temporal motion vector prediction (ATMVP).

FIG. 10 shows an example of alternative temporal motion vector prediction (ATMVP). In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.2. Spatio-Temporal Motion Vector Prediction (STMVP)

Figure 11:
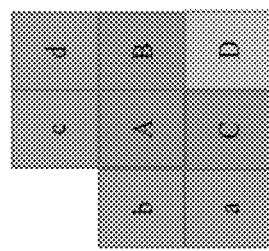
FIG. 11 shows an example of spatial-temporal motion vector prediction.

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3. Sub-CU Motion Prediction Mode Signaling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3. Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 12:
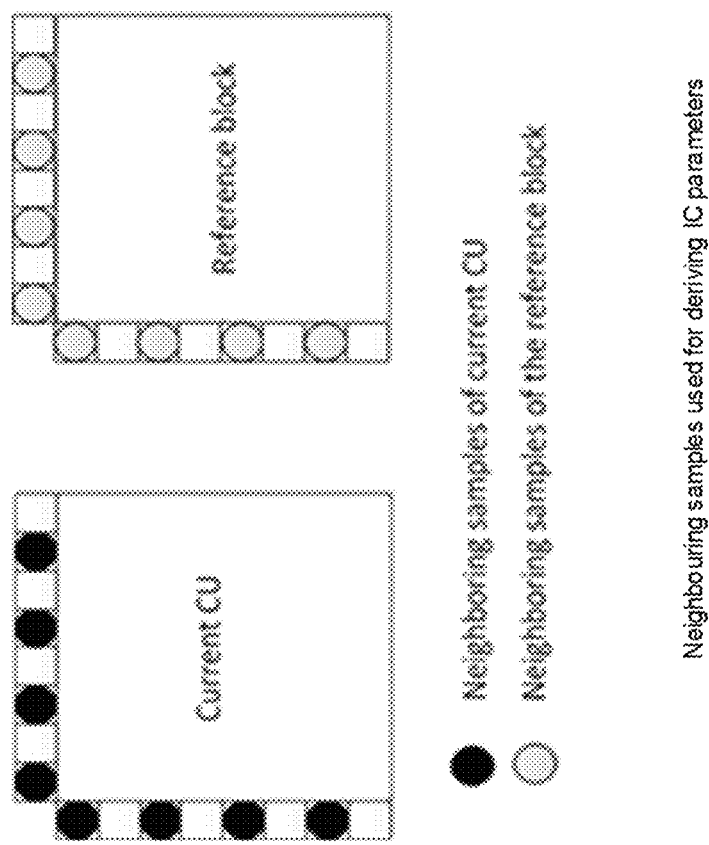
FIG. 12 shows an example of neighboring samples for deriving local illumination compensation parameters.

When LIC applies for a CU, a least square error method is employed to derive the parameters a and b by using the neighbouring samples of the current CU and their corresponding reference samples. More specifically, as illustrated in FIG. 12, the subsampled (2:1 subsampling) neighbouring samples of the CU and the corresponding samples (identified by motion information of the current CU or sub-CU) in the reference picture are used.

2.3.1. Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighbouring blocks, in a way similar to motion information copy in merge mode; otherwise, an LIC flag is signaled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.4. Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.4.1. Coding Block Structure in VVC

In VVC, a QuadTree/BinaryTree/MulitpleTree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

2.4.2 Adaptive Motion Vector Difference Resolution

In HEVC, motion vector differences (MVDs) (between the motion vector and predicted motion vector of a PU) are signaled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.4.3 Affine Motion Compensation Prediction

Figure 13B:
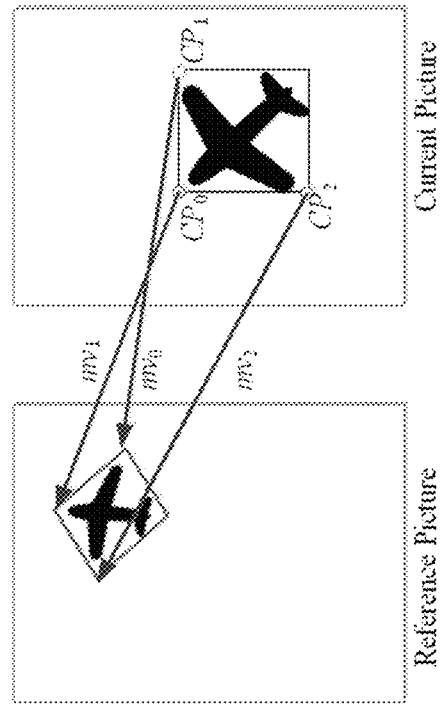
FIGS. 13A and 13B show illustrations in connection with a 4-parameter affine model and a 6-parameter affine model respectively.
Figure 13A:
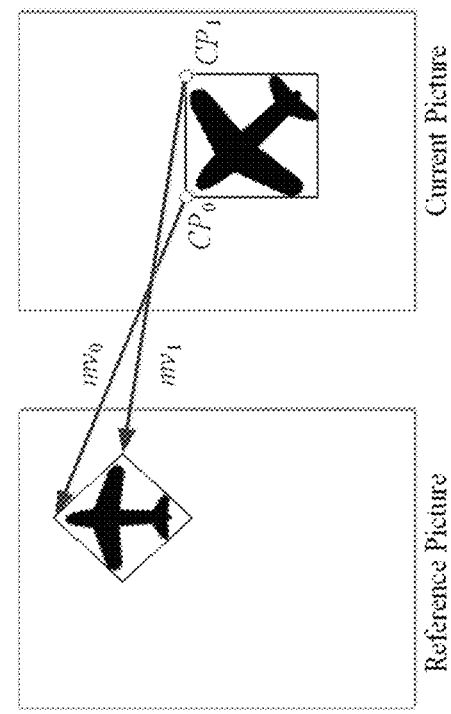

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIGS. 13A and 13B, the affine motion field of the block is described by two control point motion vectors (CPMVs) for the 4-parameter affine model and 3 CPMVs for the 6-parameter affine model respectively.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where ($mv^h_0$, $mv^h_0$) is motion vector of the top-left corner control point, and ($mv^h_1$, $mv^h_1$) is motion vector of the top-right corner control point and ($mv^h_2$, $mv^h_2$) is motion vector of the bottom-left corner control point, all of the three motion vectors are called control point motion vectors (CPMV), (x, y) represents the coordinate of a representative point relative to the top-left sample within current block and ($mv^h(x,y)$, $mv^v(x,y)$) is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 14, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.4.3.1. Signaling of Affine Prediction

Similar to the translational motion model, there are also two modes for signaling the side information due affine prediction. They are AFFINE_INTER and AFFINE_MERGE modes.

2.4.3.2. AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and the estimated CPMVs are signaled. In addition, the index of affine AMVP candidate from which the estimated CPMVs are derived is further signaled.

1) Inherited Affine Motion Predictors

Figure 16:
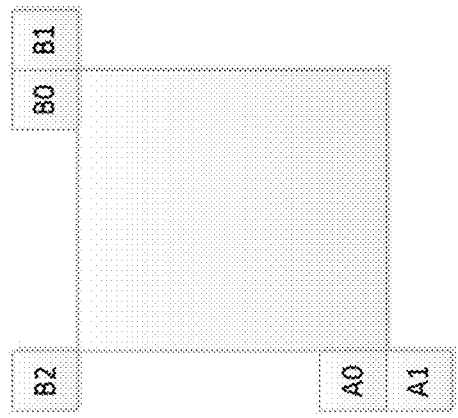
FIG. 16 shows an example of motion vector prediction for affine inter mode for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Figures 18A, 18B:
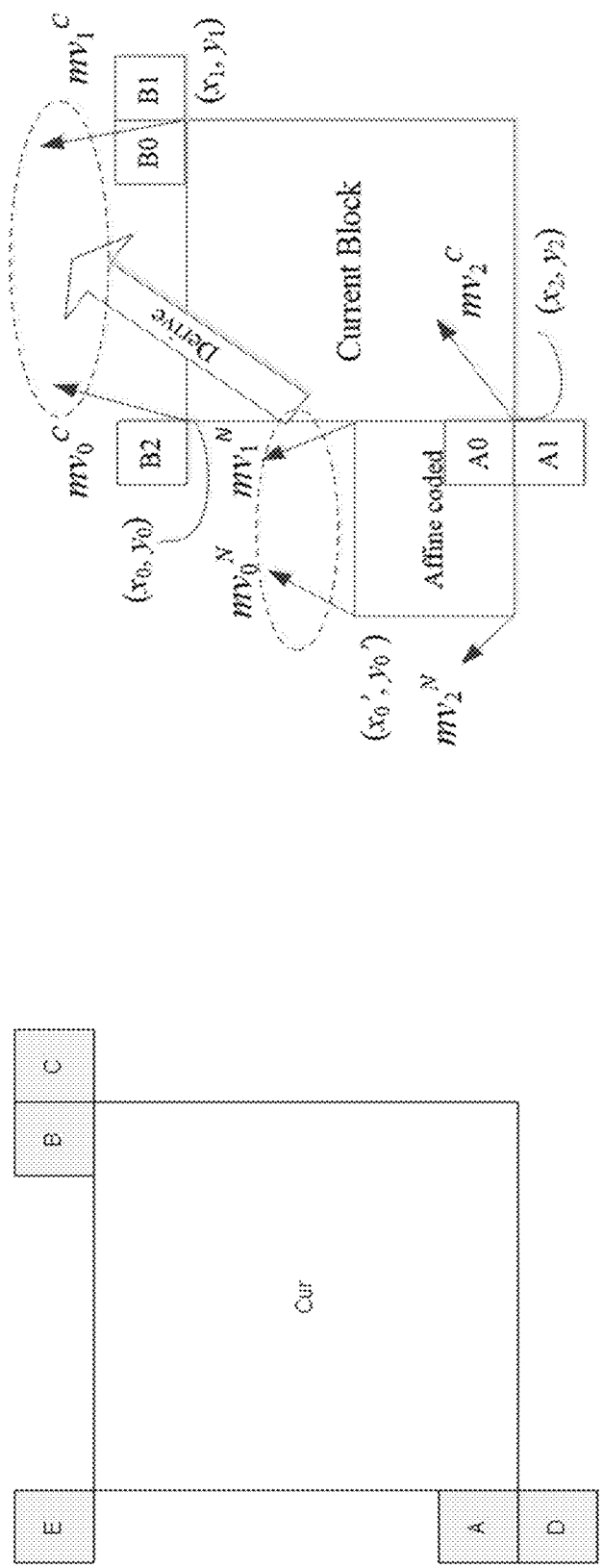
FIGS. 18A and 18B show illustrations in connection with an affine merge mode.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
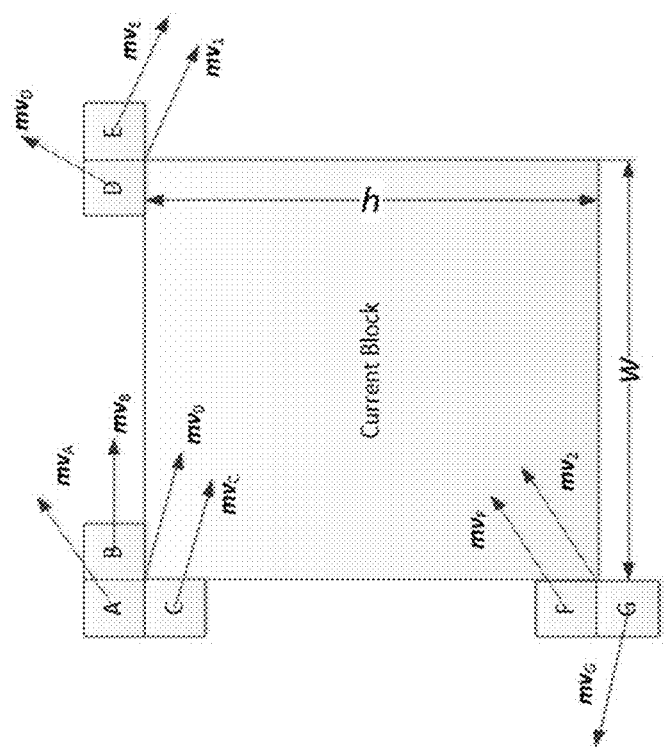
FIG. 17 shows an example of motion vector prediction for affine inter mode for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.

2) Derive an affine motion predictor by setting all CPMVs equal to $\overline{mv}_1$ if available.

3) Derive an affine motion predictor by setting all CPMVs equal to $\overline{mv}_0$ if available.

4) Derive an affine motion predictor by setting all CPMVs equal to HEVC TMVP if available.

5) Derive an affine motion predictor by setting all CPMVs to zero MV.

Note that $\overline{mv}_i$ is already derived in constructed affine motion predictor.

Figure 15B:
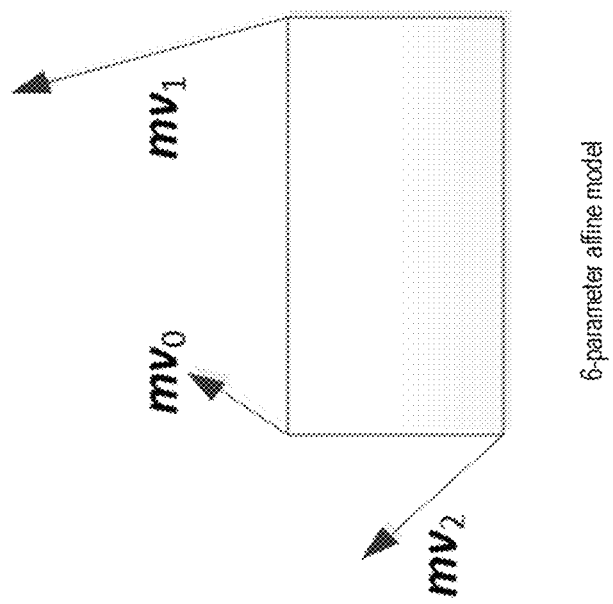
FIGS. 15A and 15B show examples of a 4-parameter affine model and a 6-parameter affine model respectively.
Figure 15A:
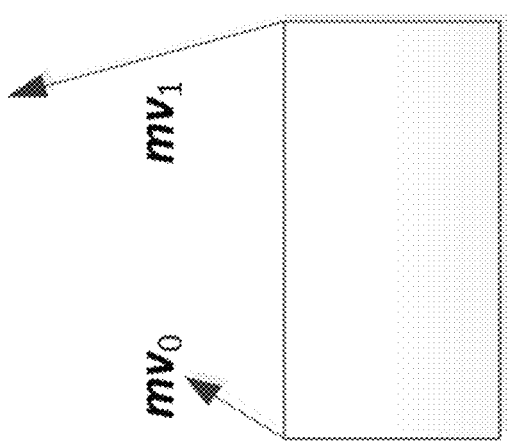

In AF_INTER mode, when 4/6-parameter affine mode is used, ⅔ control points are required, and therefore ⅔ MVD needs to be coded for these control points, as shown in FIG. 15A. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.4.3.3. AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 18A (denoted by A, B, C, D, E in order). For example, if the neighbour left bottom block is coded in affine mode as denoted by A0 in FIG. 18B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks store the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signaled in the bitstream when there is at least one neighbour block is coded in affine mode.

In JVET-L0142 and JVET-L0632, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 19:
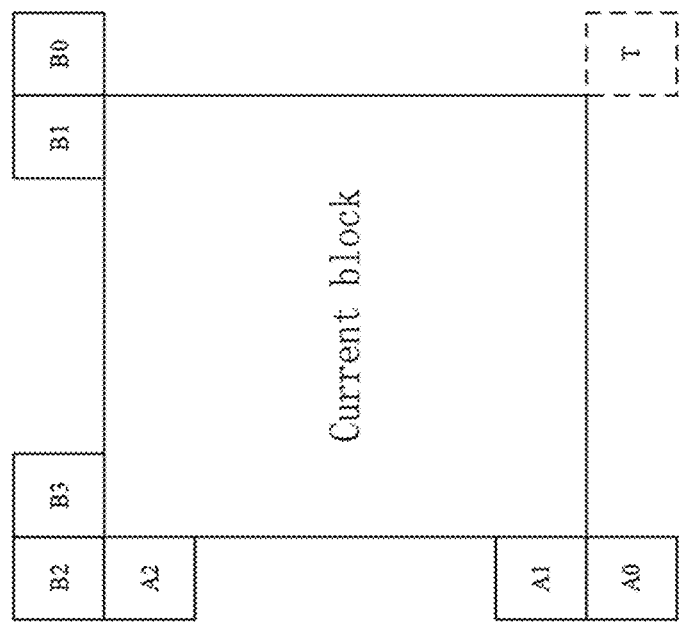
FIG. 19 shows examples of candidate positions for an affine merge mode
Figure 20:
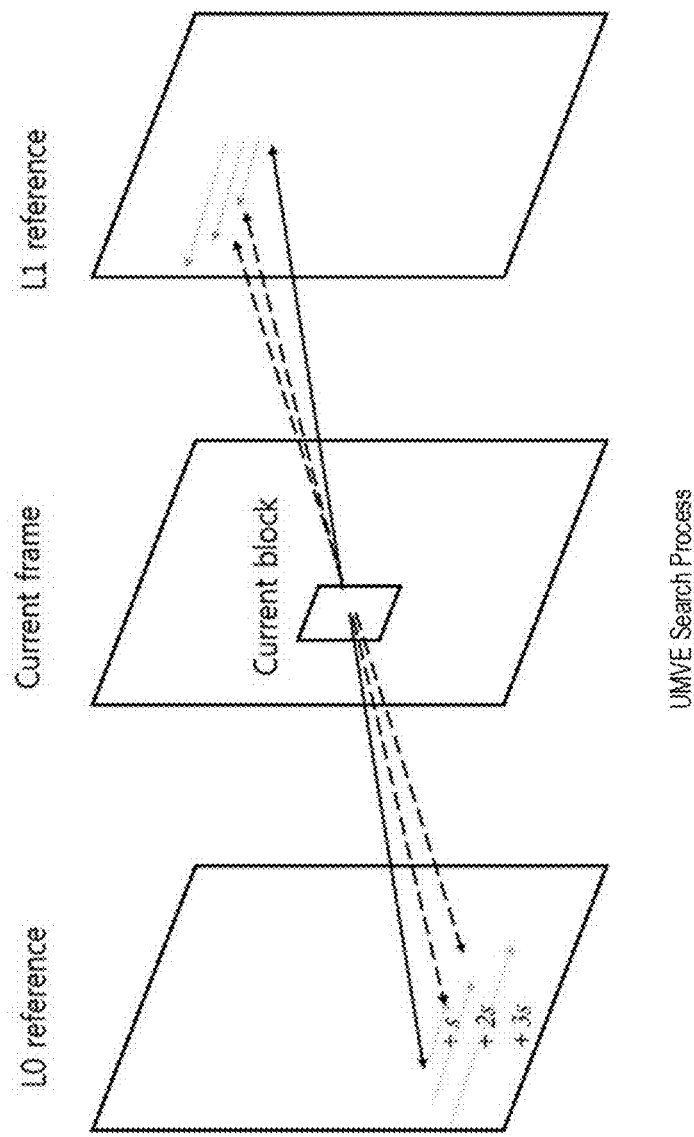
FIG. 20 shows an example of an ultimate vector expression (UMVE) search process.

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is unavailable, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order: {CP1, CP2, CP3}, {CP, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.4.4. Merge with Motion Vector Differences (MMVD)

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.4.5. Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 22:
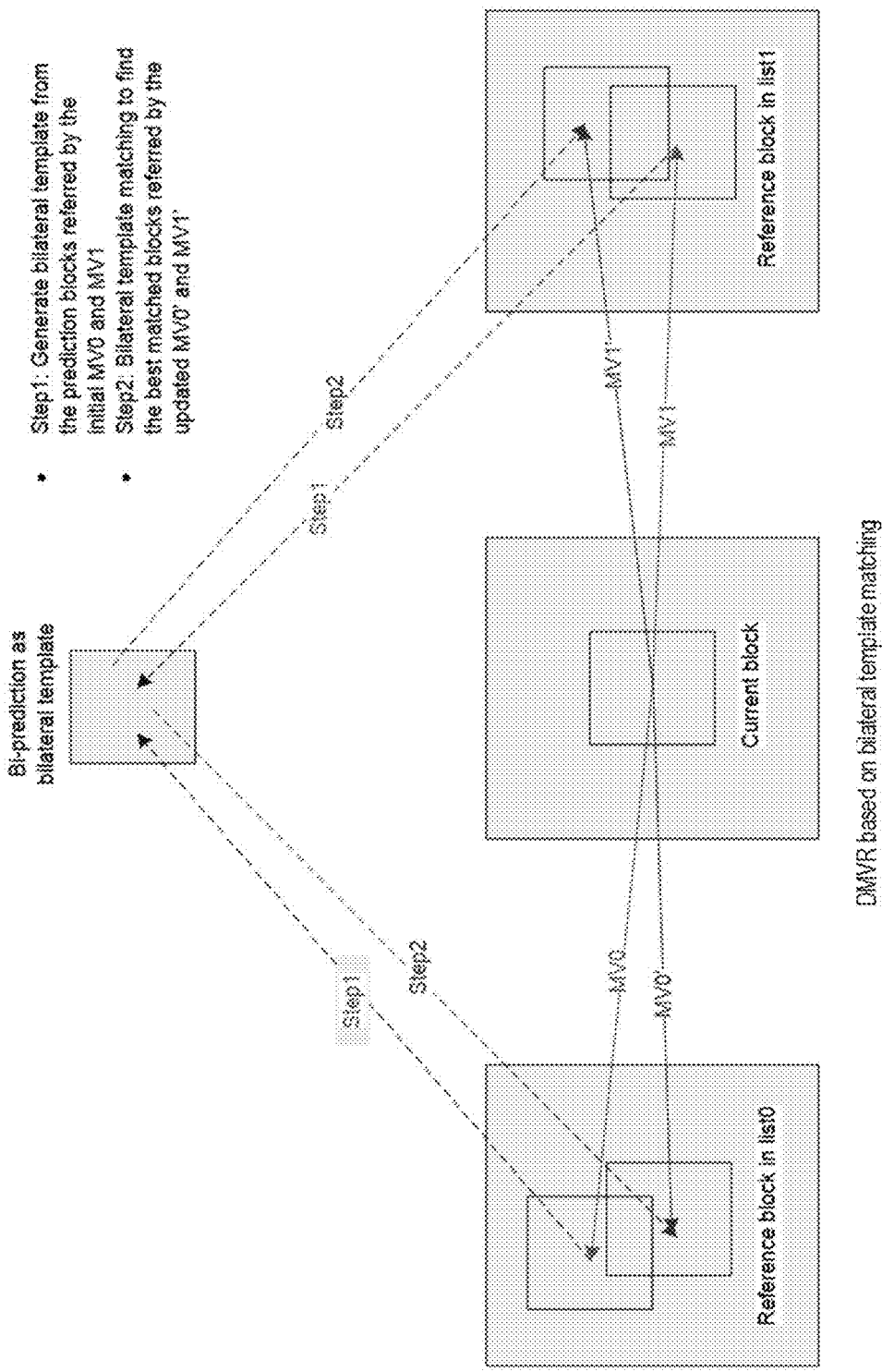
FIG. 22 shows an example of decoder-side motion video refinement (DMVR).

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 22. The bilateral template is generated as the weighted combination (i.e. average) of the two prediction blocks, from the initial MV0 of list0 and MV1 of list1, respectively, as shown in FIG. 22. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 22, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

To further simplify the process of DMVR, JVET-M0147 proposed several changes to the design in JEM. More specifically, the adopted DMVR design to VTM-4.0 (to be released soon) has the following main features:

Early termination w/(0,0) position SAD between list0 and list1

Block sizes for DMVR W*H>=64 && H>=8

Split the CU into multiple of 16×16 sub-blocks for DMVR of CU size>16*16

Reference block size (W+7)*(H+7) (for luma)

25 points SAD-based integer-pel search (i.e. (+−) 2 refinement search range, single stage)

Bilinear-interpolation based DMVR

MVD mirroring between list0 and list1 to allow bilateral matching

"Parametric error surface equation" based sub-pel refinement

Luma/chroma MC w/reference block padding (if needed)

Refined MVs used for MC and TMVPs only 2.4.6. Combined Intra and Inter Prediction In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.5 In-Loop Reshaping (ILR) in JVET-M0427

The in-loop reshaping (ILR) is also known as Luma Mapping with Chroma Scaling (LMCS).

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

2.5.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=(m*x+2^{FP\_PREC-1})>>FP\_PREC)+c$$

where m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without pre-computing the LUTs.

2.5.2. Test CE12-2

2.5.2.1. Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 23:
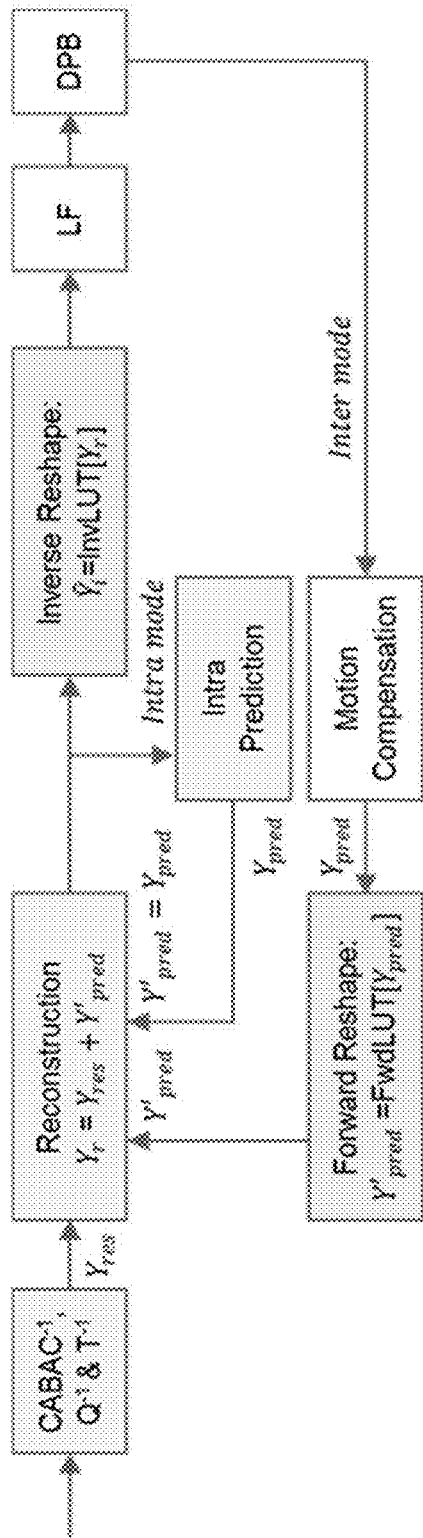
FIG. 23 shows a block diagram flowchart of decoding with reshaping step.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 23 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (light-green shaded blocks indicate signal in reshaped domain: luma residue; intra luma predicted; and intra luma reconstructed)

2.5.2.2. Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.5.2.3. Signaling of ILR Side Information The parameters are (currently) sent in the tile group header (similar to ALF). These reportedly take 40-100 bits.

The following tables are based on version 9 of JVET-L1001. The syntax to be added is highlighted below in underlined bolded italicized font.

In 7.3.2.1 Sequence parameter the RBSP syntax can be set as follows:

| | Descriptor |
|---|---|
| seq_parameter_set_rbsp( ) { | |
|   sps_seq_parameter_set_id | ue(v) |
|   intra_only_constraint_flag | u(1) |
|   max_bitdepth_constraint_idc | u(4) |
|   max_chroma_format_constraint_idc | u(2) |
|   frame_only_constraint_flag | u(1) |
|   no_qtbtt_dual_tree_intra constraint_flag | u(1) |
|   no_sao_constraint_flag | u(1) |
|   no_alf_constraint_flag | u(1) |
|   no_pcm_constraint_flag | u(1) |
|   no_temporal_mvp_constraint_flag | u(1) |
|   no_sbtmvp_constraint_flag | u(1) |
|   no_amvr_constraint_flag | u(1) |
|   no_cclm_constraint_flag | u(1) |
|   no_affine_motion_constraint_flag | u(1) |
|   no_ladf_constraint_flag | u(1) |
|   no_dep_quant_constraint_flag | u(1) |
|   no_sign_data_hiding_constraint_flag | u(1) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   log2_max_pic_order_cnt_lsb_minus4 | ue(v) |
|   qtbtt_dual_tree_intra_flag | ue(v) |
|   log2_ctu_size_minus2 | ue(v) |
|   log2_min_luma_coding_block_size_minus2 | ue(v) |
|   partition_constraints_override_enabled_flag | ue(v) |
|   sps_log2_diff_min_qt_min_cb_intra_tile_group_luma | ue(v) |
|   sps_log2_diff_min_qt_min_cb_inter_tile_group | ue(v) |
|   sps_max_mtt_hierarchy_depth_inter_tile_groups | ue(v) |
|   sps_max_mtt_hierarchy_depth_intra_tile_groups_luma | ue(v) |
|   if( sps_max_mtt_hierarchy_depth_intra_tile_groups_luma != 0 ) { | |
|     sps_log2_diff_max_bt_min_qt_intra_tile_group_luma | ue(v) |
|     sps_log2_diff_max_tt_min_qt_intra_tile_group_luma | ue(v) |
|   } | |
|   if( sps_max_mtt_hierarchy_depth_inter_tile_groups != 0 ) { | |
|     sps_log2_diff_max_bt_min_qt_inter_tile_group | ue(v) |
|     sps_log2_diff_max_tt_min_qt_inter_tile_group | ue(v) |
|   } | |
|   if( qtbtt_dual_tree_intra_flag ) { | |
|     sps_log2_diff_min_qt_min_cb_intra_tile_group_chroma | ue(v) |
|     sps_max_mtt_hierarchy_depth_intra_tile_groups_chroma | ue(v) |
|     if ( sps_max_mtt_hierarchy_depth_intra_tile_groups_chroma != 0 ) { | |
|       sps_log2_diff_max_bt_min_qt_intra_tile_group_chroma | ue(v) |
|       sps_log2_diff_max_tt_min_qt_intra_tile_group_chroma | ue(v) |
|     } | |
|   } | |
|   sps_sao_enabled_flag | u(1) |
|   sps_alf_enabled_flag | u(1) |
|   pcm_enabled_flag | u(1) |
|   if( pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } | |
|   sps_ref_wraparound_enabled_flag | u(1) |
|   if( sps_ref_wraparound_enabled_flag ) | |
|     sps_ref_wraparound_offset | ue(v) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_cclm_enabled_flag | u(1) |
|   sps_mts_intra_enabled_flag | u(1) |
|   sps_mts_inter_enabled_flag | u(1) |
|   sps_affine_enabled_flag | u(1) |
|   if( sps_affine_enabled_flag ) | |
|     sps_affine_type_flag | u(1) |
|   sps_gbi_enabled_flag | u(1) |
|   sps_cpr_enabled_flag | u(1) |
|   sps_ciip_enabled_flag | u(1) |
|   sps_triangle_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   sps_reshaper_enabled_flag | u(1) |
|   rbsp_trailing_bits( ) | |
| } | |

In 7.3.3.1 the General tile group header syntax can be modified by insertion of the underlined bolded italicized text as follows:

| | Descriptor |
|---|---|
| tile_group_header( ) { | |
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   tile_group_type | ue(v) |
|   tile_group_pic_order_cnt_lsb | u(v) |
|   if( partition_constraints_override_enabled_flag ) { | |
|     partition_constraints_override_flag | ue(v) |
|     if( partition_constraints_override_flag ) { | |
|       tile_group_log2_diff_min_qt_min_cb_luma | ue(v) |
|       tile_group_max_mtt_hierarchy_depth_luma | ue(v) |
|       if( tile_group_max_mtt_hierarchy_depth_luma !=0 ) | |
|         tile_group_log2_diff_max_bt_min_qt_luma | ue(v) |
|         tile_group_log2_diff_max_tt_min_qt_luma | ue(v) |
|       } | |
|       if( tile_group_type = = I && qtbtt_dual_tree_intra_flag ) { | |
|         tile_group_log2_diff_min_qt_min_cb_chroma | ue(v) |
|         tile_group_max_mtt_hierarchy_depth_chroma | ue(v) |
|         if( tile_group_max_mtt_hierarchy_depth_chroma != 0 ) | |
|           tile_group_log2_diff_max_bt_min_qt_chroma | ue(v) |

| | Descriptor |
|---|---|
|         tile_group_log2_diff_max_tt_min_qt_chroma | ue(v) |
|       } | |
|     } | |
|   } | |
| } | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   six_minus_max_num_merge_cand | ue(v) |
|   if( sps_affine_enable_flag ) | |
|     five_minus_max_num_subblock_merge_cand | ue(v) |
| } | |
| tile_group_qp_delta | se(v) |
| if( pps_tile_group_chroma_qp_offsets_present_flag ) { | |
|   tile_group_cb_qp_offset | se(v) |
|   tile_group_cr_qp_offset | se(v) |
| } | |
| if( sps_sao_enabled_flag ) { | |
|   tile_group_sao_luma_flag | u(1) |
|   if( ChromaArrayType != 0 ) | |
|     tile_group_sao_chroma_flag | u(1) |
| } | |
| if( sps_alf_enabled_flag ) { | |
|   tile_group_alf_enabled_flag | u(1) |
|   if( tile_group_alf_enabled_flag ) | |
|     alf_data( ) | |
| } | |
|   if( tile_group_type = = P | | tile_group_type = =B ) { | |
|     num_ref_idx_l0_active_minus1 | ue(v) |
|   if( tile_group_type = = B ) | |
|     num_ref_idx_l1_active_minus1 | ue(v) |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   tile_group_deblocking_filter_disabled_flag | u(1) |
|   if( !tile_group_deblocking_filter_disabled_flag ) { | |
|   tile_group_beta_offset_div2 | se(v) |
|   tile_group_tc_offset_div2 | se(v) |
|   } | |
| } | |
| if( num_tiles_in_tile_group_minus1 >0 ) { | |
|   offset_len_minus1 | ue(v) |
|   for( i =0; i < num_tiles_in_tile_group_minus1; i++ ) | |
|     entry_point_offset_minus1[ i ] | u(v) |
| } | |
| <u>if ( sps_reshaper_enabled_flag ) {</u> | |
| <u>  tile_group_reshaper_model_present_flag</u> | u(1) |
| <u>  if ( tile_group_reshaper_model_present_flag )</u> | |
| <u>    tile_group_reshaper_model ( )</u> | |
| <u>  tile_group_reshaper_enable_flag</u> | u(1) |
| <u>  if ( tile_group_reshaper_enable_flag && (!( qtbtt_dual_tree_intra_flag && tile_group_type == I ) ) )</u> | |
| <u>    tile_group_reshaper_chroma_residual_scale_flag</u> | u(1) |
| <u>}</u> | |
|   byte_alignment( ) | |
| } | |

A new syntax table tile group reshaper model can be added as follows:

| | Descriptor |
|---|---|
| <u>tile_group_reshaper_model ( ) {</u> | |
| <u>  reshaper_model_min_bin_idx</u> | ue(v) |
| <u>  reshaper_model_delta_max_bin_idx</u> | ue(v) |
| <u>  reshaper_model_bin_delta_abs_cw_prec_minus1</u> | ue(v) |
| <u>  for ( i = reshaper_model_min_bin_idx;</u> | — |
| <u>    i <= reshaper_model_max_bin_idx; i++ ) {</u> | |

-continued

| | Descriptor |
|---|---|
| reshape_model_bin_delta_abs_CW [ i ] | u(v) |
| if ( reshaper_model_bin_delta_abs_CW[ i ] ) > 0 ) | |
| reshaper_model_bin_delta_sign_CW_flag[ i ] | u(1) |
| } | |
| } | |

In General sequence parameter set RBSP semantics, the following semantics can be added:

sps_reshaper_enabled_flag equal to 1 specifies that reshaper is used in the coded video sequence (CVS). sps_reshaper_enabled_flag equal to 0 specifies that reshaper is not used in the CVS.

In tile group header syntax, the following semantics can be added:

tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.

tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.

tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

The tile_group_reshaper_model( ) syntax can be added as follows:

reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx_reshape_model_delta_max_bin_idx.

reshaper_model_bin_delta_abs_cw_prec_minus1 plus 1 specifies the number of bits used for the representation of the syntax reshape_model_bin_delta_abs_CW[i].

reshape_model_bin_delta_abs_CW[i] specifies the absolute delta codeword value for the ith bin.

reshaper_model_bin_delta_sign_CW_flag[i] specifies the sign of reshape_model_bin_delta_abs_CW[i] as follows:

If reshape_model_bin_delta_sign_CW_flag[i] is equal to 0, the corresponding variable RspDeltaCW[i] is a positive value.

Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0.

The variable RspDeltaCW[i]=(1 2*reshape_model_bin_delta_sign_CW [i])*reshape_model_bin_delta_abs_CW[i];

The variable RspCW[i] is derived as following steps:

The variable OrgCW is set equal to $(1<<BitDepth_Y)/(MaxBinIdx+1)$.

If reshaper_model_min_bin_idx<=i<=reshaper_model_max_bin_idx

RspCW[i]=OrgCW+RspDeltaCW[i].

Otherwise, RspCW[i]=0.

The value of RspCW[i] shall be in the range of 32 to 2*OrgCW−1 if the value of $BitDepth_Y$ is equal to 10.

The variables InputPivot[i] with i in the range of 0 to MaxBinIdx+1, inclusive are derived as follows InputPivot[i]=i*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

shiftY=14
ReshapePivot[0]=0;
for(i=0; i<=MaxBinIdx; i++) {
ReshapePivot[i+1]=ReshapePivot[i]+RspCW[i]
ScaleCoef[i]=(RspCW[i]*(1<<shiftY)+(1<<(Log 2(OrgCW)−1)))>>(Log 2(OrgCW)) if (RspCW[ i]==0)
InvScaleCoeff[i]=0
else
InvScaleCoeff[i]=OrgCW*(1<<shiftY)/RspCW[i]
}

The variable ChromaScaleCoef[i] with i in the range of 0 to MaxBinIdx, inclusive, can be derived as follows:

ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 10241;

shiftC=11
if (RspCW[ i]==0)
ChromaScaleCoef[ i]=(1<<shiftC)
Otherwise (RspCW[i] !=0),
ChromaScaleCoef[i]=ChromaResidualScaleLut
[RspCW[i]>>1]

The following text can be added in connection with weighted sample prediction process for combined merge and intra prediction. The addition is marked in underlined italicized font.

8.4.6.6 Weighted Sample Prediction Process for Combined Merge and Intra Prediction Inputs to this process are:
 the width of the current coding block cbWidth,
 the height of the current coding block cbHeight,
 two (cbWidth)×(cbHeight) arrays predSamplesInter and predSamplesIntra,
 the intra prediction mode predModeIntra,
 a variable cIdx specifying the colour component index.

Output of this process is the (cbWidth)×(cbHeight) array predSamplesComb of prediction sample values. The variable bitDepth is derived as follows:

If cIdx is equal to 0, bitDepth is set equal to $BitDepth_Y$.

Otherwise, bitDepth is set equal to $BitDepth_C$.

The prediction samples predSamplesComb[x][y] with x=0 . . . cbWidth−1 and y=0 . . . cbHeight−1 are derived as follows:

The weight w is derived as follows:
  If predModeIntra is INTRA_ANGULAR50, w is specified in Table 4 with nPos equal to y and nSize equal to cbHeight.
  Otherwise, if predModeIntra is INTRA_ANGULAR18, w is specified in Table 8-10 with nPos equal to x and nSize equal to cbWidth.
  Otherwise, w is set equal to 4.
If cIdx is equal to 0, predSamplesInter is derived as following:
  If tile_group_reshaper_enabled_flag is equal to 1,
  shiftY=14
  idxY=predSamplesInter[x][y]>>Log 2(OrgCW)

$$\text{predSamplesInter}[x][y] = \text{Clip1}_Y(\text{ReshapePivot}[idxY] + \\ (\text{ScaleCoeff}[idxY] * (\text{predSamplesInter}[x][y] - \\ \text{InputPivot}[idxY]) + (1 << (\text{shift}Y - 1))) >> \text{shift}Y) \quad (8\text{-xxx})$$

Otherwise (tile_group_reshaper_enabled_flag is equal to 0)
  predSamplesInter[x][y]=predSamplesInter[x][y]
The prediction samples predSamplesComb[x][y] are derived as follows:

$$\text{predSamplesComb}[x][y] = (w * \text{predSamplesIntra}[x][y] + \\ (8-w) * \text{predSamplesInted}[x][y]) >> 3) \quad (8\text{-740})$$

TABLE 4

Specification of w as a function of the position nP and the size nS

| 0 <= nP < (nS/4) | (nS/4) <= nP < (nS/2) | (nS/2) <= nP < (3 * nS/4) | (3 * nS/4) <= nP < nS |
|---|---|---|---|
| 6 | 5 | 3 | 2 |

The following text shown in underlined bolded italicized font can be added in the Picture reconstruction process:
8.5.5 Picture Reconstruction Process
Inputs to this process are:
  a location (xCurr, yCurr) specifying the top-left sample of the current block relative to the top-left sample of the current picture component,
  the variables nCurrSw and nCurrSh specifying the width and height, respectively, of the current block,
  a variable cIdx specifying the colour component of the current block,
  an (nCurrSw)×(nCurrSh) array predSamples specifying the predicted samples of the current block,
  an (nCurrSw)×(nCurrSh) array resSamples specifying the residual samples of the current block.
Depending on the value of the colour component cIdx, the following assignments are made:
  If cIdx is equal to 0, recSamples corresponds to the reconstructed picture sample array $S_L$ and the function clipCidx1 corresponds to $\text{Clip1}_Y$.
  Otherwise, if cIdx is equal to 1, recSamples corresponds to the reconstructed chroma sample array $S_{Cb}$ and the function clipCidx1 corresponds to $\text{Clip1}_C$.
  Otherwise (cIdx is equal to 2), recSamples corresponds to the reconstructed chroma sample array $S_{Cr}$ and the function clipCidx1 corresponds to $\text{Clip1}_C$.
When the value of tile group reshaper_enabled_flag is equal to 1, the (nCurrSw)×(nCurrSh) block of the reconstructed sample array recSamples at location (xCurr, yCurr) is derived as the mapping process specified in clause 8.5.5.1.
Otherwise, the (nCurrSw)×(nCurrSh) block of the reconstructed sample array recSamples at location (xCurr, yCurr) is derived as follows:

$$\text{recSamples}[x\text{Curr}+i][y\text{Curr}+j] = \text{clipCidx1}(\text{predSamples}[i][j] + \text{resSamples}[i][j]) \quad (8\text{-xxx})$$

with i=0 . . . nCurrSw−1, j=0 . . . nCurrSh−1
8.5.5.1 Picture Reconstruction with Mapping Process
This clause specifies picture reconstruction with mapping process. The picture reconstructon with mapping process for luma sample value is specified in 8.5.5.1.1. The picture reconstructon with mapping process for chroma sample value is specified in 8.5.5.1.2.
8.5.5.1.1 Picture Reconstructon with Mapping Process for Luma Sample Value
Inputs to this process are:
  an (nCurrSw)×(nCurrSh) array predSamples specifying the luma predicted samples of the current block,
  an (nCurrSw)×(nCurrSh) array resSamples specifying the luma residual samples of the current block.
The output for this process are:
  an (nCurrSw)×(nCurrSh) mapped luma prediction sample array predMapSamples,
  an (nCurrSw)×(nCurrSh) reconstructed luma sample array recSamples.
The predMapSamples is derived as follows:
  If (CuPredMode[xCurr][yCurr]==MODE_INTRA)||(CuPredMode[xCurr][yCurr]==MODE_CPR)||CuPredMode[xCurr][yCurr]==MODE_INTER && mh_intra_flag[xCurr][yCurr])

$$\text{predMapSamples}[x\text{Curr}+i][y\text{Curr}+j] = \text{predSamples}[i][j] \quad (8\text{-xxx})$$

with i=0 . . . nCurrSw−1, j=0 . . . nCurrSh−1
Otherwise ((CuPredMode[xCurr][yCurr]==MODE_INTER && !mh_intra_flag[xCurr][yCurr])), the following applies:
shiftY=14
idxY=predSamples[i][j]>>Log 2(OrgCW)

$$\text{predMapSamples}[x\text{Curr}+i][y\text{Curr}+j] = \text{ReshapePivot}[idxY] + (\text{ScaleCoeff}[idxY] * (\text{predSamples}[i][j] - \text{InputPivot}[idxY]) + (1 << (\text{shift}Y - 1))) >> \text{shift}Y \quad (8\text{-xxx})$$

with i=0 . . . nCurrSw−1, j=0 . . . nCurrSh−1
The recSamples is derived as follows:

$$\text{recSamples}[x\text{Curr}+i][y\text{Curr}+j] = \text{Clip1}_Y(\text{predMapSamples}[x\text{Curr}+i][y\text{Curr}+j] + \text{resSamples}[i][j]) \quad (8\text{-xxx})$$

with i=0 . . . nCurrSw−1, j=0 . . . nCurrSh−1
8.5.5.1.2 Picture Reconstructon with Mapping Process for Chroma Sample Value
Inputs to this process are:
  an (nCurrSwx2)×(nCurrShx2) array mapped predMapSamples specifying the mapped luma predicted samples of the current block,
  an (nCurrSw)×(nCurrSh) array predSamples specifying the chroma predicted samples of the current block,
  an (nCurrSw)×(nCurrSh) array resSamples specifying the chroma residual samples of the current block.
The output for this process is reconstructed chroma sample array recSamples.
The recSamples is derived as follows:
  If (!tile_group_reshaper_chroma_residual_scale_flag|| ((nCurrSw)×(nCurrSh)<=4))

$$\text{recSamples}[x\text{Curr}+i][y\text{Curr}+j] = \text{Clip1}_C(\text{predSamples}[i][j] + \text{resSamples}[i][j]) \quad (8\text{-xxx})$$

with i=0 . . . nCurrSw−1, j=0 . . . nCurrSh−1
Otherwise (tile_group_reshaper_chroma_residual_scale_flag && ((nCurrSw)×(nCurrSh)>4)), the following applies:

The variable varScale is derived as follows:
1. invAvgLuma=Clip1$_Y$(($\Sigma_i\Sigma_j$ predMapSamples [(xCurr<<1)+i][(yCurr<<1)+j]+ nCurrSw*nCurrSh*2)/(nCurrSw*nCurrSh*4))
2. The variable idxYInv is derived by involving the identification of piece-wise function index as specified in clause 8.5.6.2 with the input of sample value invAvgLuma.
3. varScale=ChromaScaleCoef[idxYInv]

The recSamples is derived as follows:
If tu_cbf_cIdx[xCurr][yCurr] equal to 1, the following applies:
shiftC=11 recSamples[xCurr+i][yCurr+j]=ClipCidx1(pred-
   Samples[i][j]+Sign(resSamples[i][j])*((Abs(res-
   Samples[i][j])*varScale+(1<<(shiftC−1)))
   >>shiftC))                                    (8-xxx)

with i=0 . . . nCurrSw−1, j=0 . . . nCurrSh−1
Otherwise (tu_cbf_cIdx[xCurr][yCurr] equal to 0)

recSamples[xCurr+i][yCurr+j]=ClipCidx1(pred-
   Samples[i][j])                                (8-xxx)

with i=0 . . . nCurrSw−1, j=0 . . . nCurrSh−1

8.5.6 Picture Inverse Mapping Process
This clause is invoked when the value of tile_group_reshaper_enabled_flag is equal to 1. The input is reconstructed picture luma sample array S$_L$ and the output is modified reconstructed picture luma sample array S'$_L$ after inverse mapping process.
The inverse mapping process for luma sample value is specified in 8.4.6.1.
8.5.6.1 Picture Inverse Mapping Process of Luma Sample Values
Inputs to this process is a luma location (xP, yP) specifying the luma sample location relative to the top-left luma sample of the current picture.
Outputs of this process is a inverse mapped luma sample value invLumaSample.
The value of invLumaSample is derived by applying the following ordered steps:
1. The variables idxYInv is derived by invoking the identification of piece-wise function index as specified in clause 8.5.6.2 with the input of luma sample value S$_L$[xP][yP].
2. The value of reshapeLumaSample is derived as follows:
shiftY=14 invLumaSample=InputPivot[idxYInv]+(InvScaleCo-
   eff[idxYInv]*(S$_L$[xP][yP]−ReshapePivot[idxY-
   Inv])+(1<<(shiftY−1)))>>shiftY                (8-xx)

3. clipRange=((reshape_model_min_bin_idx>0) && (reshape_model_max_bin_idx<MaxBinIdx));
If clipRange is equal to 1, the following applies:
   minVal=16<<(BitDepth$_Y$−8)
   maxVal=235<<(BitDepth$_Y$−8)
   invLumaSample=Clip3(minVal, maxVal, invLumaSample)
else (clipRange is equal to 0),
   invLumaSample=ClipCidx1(invLumaSample),
8.5.6.2 Identification of Piecewise Function Index for Luma Components
Inputs to this process are a luma sample value S.
Output of this process is an index idxS identifying the piece to which the sample S belongs. The variable idxS is derived as follows:

```
for(idxS=0, idxFound=0; idxS<=MaxBinIdx; idxS++)
{
   if((S<ReshapePivot[idxS+1]) {
      idxFound=1
      break
   }
}
```

Note, an alternative implementation to find the identification idxS is as following:
```
if (S<ReshapePivot[reshape_model_min_bin_idx])
   idxS=0
else if (S>=ReshapePivot[reshape_model_max_bin_idx])
   idxS=MaxBinIdx
else
   idxS=findIdx (S, 0, MaxBinIdx+1, ReshapePivot[ ])
function idx=findIdx (val, low, high, pivot[ ])
   if (high−low<=1)
      idx=low
   else {
      mid=(low+high)>>1
      if (val<pivot[mid])
         high=mid
      else
         low=mid
      idx=findIdx (val, low, high, pivot[ ])
   }
}
```

2.5.2.4. Usage of ILR
At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
Current block is intra-coded
Current block is coded as CPR (current picture referencing, aka intra block copy, IBC)
Current block is coded as combined inter-intra mode (CIIP) and the forward reshaping is disabled for the intra prediction block 2.6. Virtual Pipelining Data Units (VPDU)
Virtual pipeline data units (VPDUs) are defined as non-overlapping M×M-luma(L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C(as in the current VVC) can bring coding gains, which results in 4× of VPDU size (64×64-L/32×32-C) expectedly in comparison with HEVC. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

2.7. APS

An Adaptation Parameter Set (APS) is adopted in VVC to carry ALF parameters. The tile group header contains an aps_id which is conditionally present when ALF is enabled. The APS contains an aps_id and the ALF parameters. A new NUT (NAL unit type, as in AVC and HEVC) value is assigned for APS (from JVET-M0132). For the common test conditions in VTM-4.0 (to appear), it is suggested just using aps_id=0 and sending the APS with each picture. For now, the range of APS ID values will be 0 . . . 31 and APSs can be shared across pictures (and can be different in different tile groups within a picture). The ID value should be fixed-length coded when present. ID values cannot be re-used with different content within the same picture.

2.8. Post-Reconstruction Filters 2.8.1 Diffusion Filter (DF)

In JVET-L0157, diffusion filter is proposed, wherein the intra/inter prediction signal of the CU may be further modified by diffusion filters.

2.8.1.1. Uniform Diffusion Filter

The Uniform Diffusion Filter is realized by convolving the prediction signal with a fixed mask that is either given as $h^I$ or as $h^{IV}$, defined below.

Besides the prediction signal itself, one line of reconstructed samples left and above of the block are used as an input for the filtered signal, where the use of these reconstructed samples can be avoided on inter blocks.

Let pred be the prediction signal on a given block obtained by intra or motion compensated prediction. In order to handle boundary points for the filters, the prediction signal needs to be extended to a prediction signal $pred_{ext}$. This extended prediction can be formed in two ways: Either, as an intermediate step, one line of reconstructed samples left and above of the block are added to the prediction signal and then the resulting signal is mirrored in all directions. Or only the prediction signal itself is mirrored in all directions. The latter extension is used for inter blocks. In this case, only the prediction signal itself comprises the input for the extended prediction signal $pred_{ext}$.

If the filter $h^I$ is to be used, it is proposed to replace the prediction signal pred by $h^I*$pred, using the aforementioned boundary extension. Here, the filter mask $h^I$ is given as $$h^I = (0.25)^4 \begin{pmatrix} 0 & 0 & 0 & 0 & 1 & 0 & 0 & 0 & 0 \\ 0 & 0 & 0 & 4 & 0 & 4 & 0 & 0 & 0 \\ 0 & 0 & 6 & 0 & 16 & 0 & 6 & 0 & 0 \\ 0 & 4 & 0 & 24 & 0 & 24 & 0 & 4 & 0 \\ 1 & 0 & 16 & 0 & 36 & 0 & 16 & 0 & 1 \\ 0 & 4 & 0 & 24 & 0 & 24 & 0 & 4 & 0 \\ 0 & 0 & 6 & 0 & 16 & 0 & 6 & 0 & 0 \\ 0 & 0 & 0 & 4 & 0 & 4 & 0 & 0 & 0 \\ 0 & 0 & 0 & 0 & 1 & 0 & 0 & 0 & 0 \end{pmatrix}$$

If the filter $h^{IV}$ is to be used, it is proposed to replace the prediction signal pred by $h^{IV}*$pred.

Here, the filter $h^{IV}$ is given as $h^{IV}=h^I*h^I*h^I*h^I$.

2.8.1.2. Directional Diffusion Filter

Instead of using signal adaptive diffusion filters, directional filters, a horizontal filter $h^{hor}$ and a vertical filter $h^{ver}$, are used which still have a fixed mask. More precisely, the uniform diffusion filtering corresponding to the mask $h^I$ of the previous section is simply restricted to be either applied only along the vertical or along the horizontal direction. The vertical filter is realized by applying the fixed filter mask $$h_{ver} = (0.5)^4 \begin{pmatrix} 1 \\ 0 \\ 4 \\ 0 \\ 6 \\ 0 \\ 4 \\ 0 \\ 1 \end{pmatrix}$$

to the prediction signal and the horizontal filter is realized by using the transposed mask $h_{hor}=h_{ver}^t$.

2.8.2. Bilateral Filter (BF)

Bilateral filter is proposed in JVET-L0406, and it is always applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

Figure 24:
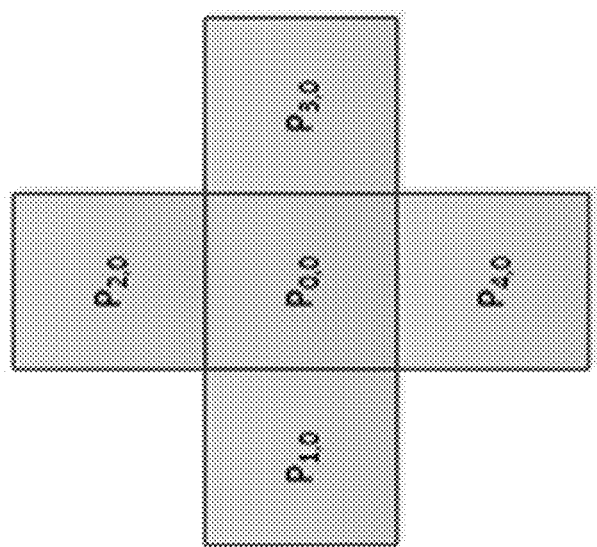
FIG. 24 shows examples of samples in a bilateral filter.

The filtering process is defined as:

$$P'_{0,0} = P_{0,0} + \sum_{k=1}^{K} W_k(\text{abs}(P_{k,0} - P_{0,0})) \times (P_{k,0} - P_{0,0}), \quad (1)$$

where $P_{0,0}$ is the intensity of the current sample and $P_{0,0}'$ is the modified intensity of the current sample, $P_{k,0}$ and $W_k$ are the intensity and weighting parameter for the k-th neighboring sample, respectively. An example of one current sample and its four neighboring samples (i.e., K=4) is depicted in FIG. 24.

More specifically, the weight $W_k(x)$ associated with the k-th neighboring sample is defined as follows:

$W_k(x)=\text{Distance}_k\times\text{Range}_k(x)$  (2)

wherein $$\text{Distance}_k = e^{\left(-\frac{10000}{2\sigma_d^2}\right)} / 1 + 4*e^{\left(-\frac{10000}{2\sigma_d^2}\right)}, \quad (3)$$

$$\text{Range}_k(x) = e^{\left(-\frac{x^2}{8*(QP-17)*(QP-17)}\right)}$$

and $\sigma_d$ is dependent on the coded mode and coding block sizes. The described filtering process is applied to intra-coded blocks, and inter-coded blocks when TU is further split, to enable parallel processing.

To better capture statistical properties of video signal, and improve performance of the filter, weights function resulted from Equation (2) are being adjusted by the $\sigma_d$ parameter, tabulated in Table 5 as being dependent on coding mode and parameters of block partitioning (minimal size).

TABLE 5

Value of $\sigma_d$ for different block sizes and coding modes

| Min (block width, block height) | Intra mode | Inter mode |
|---|---|---|
| 4 | 82 | 62 |
| 8 | 72 | 52 |
| Other | 52 | 32 |

Figure 25:
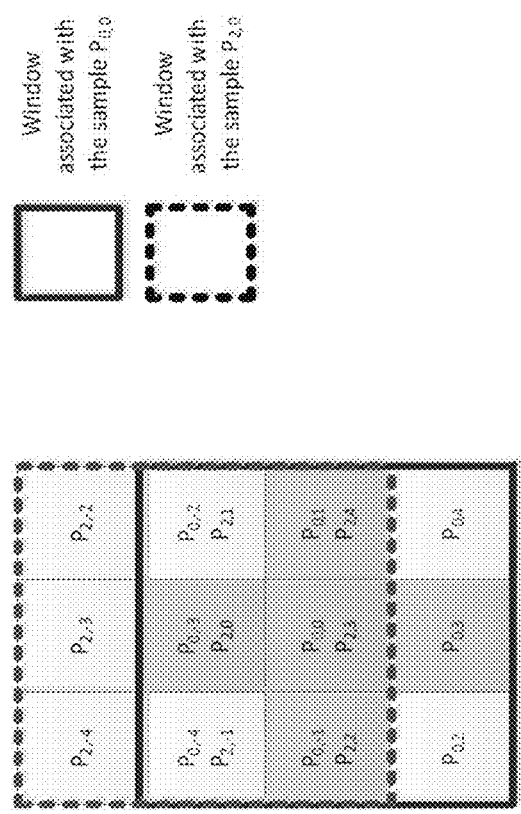
FIG. 25 shows examples of windowed samples utilized in weight calculations.

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P'_{0,0} = P_{0,0} + \sum_{k=1}^{N} W_k \left( \frac{1}{M} \sum_{m=-M/2}^{M/2} \mathrm{abs}(P_{k,m} - P_{0,m}) \right) \times (P_{k,0} - P_{0,0}) \quad (4)$$

wherein $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 25.

2.8.3. Hadamard Transform Domain Filter (HF)

In JVET-K0068, in-loop filter in 1D Hadamard transform domain which is applied on CU level after reconstruction and has multiplication free implementation. Proposed filter is applied for all CU blocks that meet the predefined condition and filter parameters are derived from the coded information.

Proposed filtering is always applied to luma reconstructed blocks with non-zero transform coefficients, excluding 4×4 blocks and if slice quantization parameter is larger than 17. The filter parameters are explicitly derived from the coded information. Proposed filter, if applied, is performed on decoded samples right after inverse transform.

For each pixel from reconstructed block pixel processing comprises the following steps:
    Scan 4 neighboring pixels around processing pixel including current one according to scan pattern
    4 point Hadamard transform of read pixels
    Spectrum filtering based on the following formula:

$$F(i, \sigma) = \frac{R(i)^2}{R(i)^2 + \sigma^2} * R(i)$$

wherein (i) is index of spectrum component in Hadamard spectrum, R(i) is spectrum component of reconstructed pixels corresponding to index, σ is filtering parameter deriving from codec quantization parameter QP using following equation:

$$\sigma = 2^{(1+0.1264*(QP-27))}$$

Figure 26:
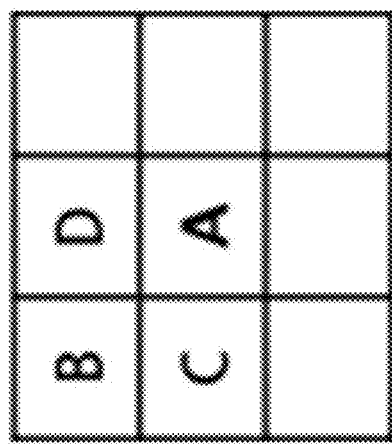
FIG. 26 shows an example scan pattern.

The example of scan pattern is depicted on FIG. 26.

For pixels laying on CU boundary, the scan pattern is adjusted ensuring all required pixels are within current CU.

3. Drawbacks of Existing Implementations

The current design of ILR may have the following problems:
1. It is possible that reshaping model information has never been signaled in the sequence, but tile_group_reshaper_enable_flag is set equal to 1 in the current slice (or tile group).
2. The stored reshaping model may come from a slice (or tile group) which cannot be used as a reference.
3. One picture may be split into several slice (or tile group), and each slice (or tile group) may signal reshaping model information.
4. Some values and ranges (such as the range of RspCW [i]) are only defined when the bit-depth is equal to 10.
5. reshape_model_delta_max_bin_idx is not well constrained.
6. reshaper_model_bin_delta_abs_cw_prec_minus1 is not well constrained.
7. ReshapePivot[i] may be larger than 1<<BitDepth −1.
8. Fixed clipping parameters (i.e., minimum value equal to 0 and maximum value equal to (1<<BD)−1) are utilized without consideration of the usage of ILR. Here, BD indicates the bit-depth.
9. Reshaping operation on chroma components only consider the 4:2:0 color format.
10. Different from luma component wherein each luma value may be reshaped differently, only one factor is selected and is used for chroma components. Such scaling may be merged into the quantization/de-quantization step to reduce the additional complexity.
11. Clipping in the picture inverse mapping process may consider the upper bound and lower bound separately.
12. ReshapePivot[i] for i is not in the range of reshaper_model_min_bin_idx<=i<=reshaper_model_max_bin_idx is not set properly.

4. Example Embodiments and Techniques

The detailed embodiments described below should be considered as examples to explain general concepts. These embodiments should not be interpreted narrowly way. Furthermore, these embodiments can be combined in any manner.
1. It is proposed that the reshaping model is initialized before decoding a sequence.
    a. Alternatively, the reshaping model is initialized before decoding an I-slice (or picture, or tile group).
    b. Alternatively, the reshaping model is initialized before decoding an instantaneous decoding refresh (IDR) slice (or picture, or tile group).
    c. Alternatively, the reshaping model is initialized before decoding a clean random access (CRA) slice (or picture, or tile group).
    d. Alternatively, the reshaping model is initialized before decoding an intra random access point (I-RAP) slice (or picture, or tile group). I-RAP slices (or pictures, or tile groups) may include IDR slices (or pictures, or tile groups) and/or CRA slices (or pictures, or tile groups) and/or broken link access (BLA) slices (or pictures, or tile groups).
    e. In one example of initializing the reshaping model, OrgCW is set equal to (1<<BitDepth$_Y$)/(MaxBinIdx+1). ReshapePivot[i]=InputPivot[i]=i*OrgCW for i=0, 1, . . . , MaxBinIdx;

f. In one example of initializing the reshaping model, ScaleCoef[i]=InvScaleCoeff[i]=1<<shiftY for i=0, 1, ..., MaxBinIdx;

g. In one example of initializing the reshaping model, OrgCW is set equal to (1<<BitDepth$_Y$)/(MaxBinIdx+1). RspCW[i]=OrgCW for i=0, 1, ..., MaxBinIdx.

h. Alternatively, default reshaping model information may be signaled at sequence level (such as in SPS), or picture level (such as in PPS) and the reshaping model is initialized to be the default one.

i. Alternatively, when the reshaping model is not initialized, it is constrained that ILR shall be disabled.

2. It is proposed that the reshaping model information (such as the information in tile_group_reshaper_model( ) can only be signaled in an I-slice (or picture, or tile group).

a. Alternatively, the reshaping model information (such as the information in tile_group_reshaper_model( ) can only be signaled in an IDR-slice (or picture, or tile group).

b. Alternatively, the reshaping model information (such as the information in tile_group_reshaper_model( ) can only be signaled in an CRA-slice (or picture, or tile group).

c. Alternatively, the reshaping model information (such as the information in tile_group_reshaper_model( ) can only be signaled in an I-RAP slice (or picture, or tile group). I-RAP slices (or pictures, or tile groups) may include IDR slices (or pictures, or tile groups) and/or CRA slices (or pictures, or tile groups) and/or broken link access (BLA) slices (or pictures, or tile groups).

d. Alternatively, the reshaping model information (such as the information in tile_group_reshaper_model( ) can be signaled at sequence level (such as in SPS), or picture level (such as in PPS) or APS.

3. It is proposed to disallow to utilize the reshaping information from a picture/slice/tile group across a certain picture type (such as an TRAP picture).

a. In one example, the reshaping model information signaled in a first slice (or picture, or tile group) cannot be used by a second slice (or picture, or tile group) if an I slice (or picture, or tile group) is transmitted after the first slice (or picture, or tile group) but before the second slice (or picture, or tile group), or the second slice (or picture, or tile group) itself is an I slice (or picture, or tile group).

b. Alternatively, the reshaping model information signaled in a first slice (or picture, or tile group) cannot be used by a second slice (or picture, or tile group) if an IDR slice (or picture, or tile group) is transmitted after the first slice (or picture, or tile group) but before the second slice (or picture, or tile group), or the second slice (or picture, or tile group) itself is an IDR slice (or picture, or tile group).

c. Alternatively, the reshaping model information signaled in a first slice (or picture, or tile group) cannot be used by a second slice (or picture, or tile group) if an CRA slice (or picture, or tile group) is transmitted after the first slice (or picture, or tile group) but before the second slice (or picture, or tile group), or the second slice (or picture, or tile group) itself is an CRA slice (or picture, or tile group).

d. Alternatively, the reshaping model information signaled in a first slice (or picture, or tile group) cannot be used by a second slice (or picture, or tile group) if I-RAP slice (or picture, or tile group) is transmitted after the first slice (or picture, or tile group) but before the second slice (or picture, or tile group), or the second slice (or picture, or tile group) itself is an I-RAP slice (or picture, or tile group). I-RAP slices (or pictures, or tile groups) may include IDR slices (or pictures, or tile groups) and/or CRA slices (or pictures, or tile groups) and/or broken link access (BLA) slices (or pictures, or tile groups).

4. In one example, a flag is signaled in an I-slice (or picture, or tile group). If the flag is X, the reshaping model information is signaled in this slice (or picture, or tile group), Otherwise, the reshaping model is initialized before decoding this slice (or picture, or tile group). For example, X=0 or 1.

a. Alternatively, a flag is signaled in an IDR-slice (or picture, or tile group). If the flag is X, the reshaping model information is signaled in this slice (or picture, or tile group), Otherwise, the reshaping model is initialized before decoding this slice (or picture, or tile group). For example, X=0 or 1.

b. Alternatively, a flag is signaled in an CRA-slice (or picture, or tile group). If the flag is X, the reshaping model information is signaled in this slice (or picture, or tile group), Otherwise, the reshaping model is initialized before decoding this slice (or picture, or tile group). For example, X=0 or 1.

c. Alternatively, a flag is signaled in an I-RAP slice (or picture, or tile group). If the flag is X, the reshaping model information is signaled in this slice (or picture, or tile group), Otherwise, the reshaping model is initialized before decoding this slice (or picture, or tile group). For example, X=0 or 1. I-RAP slices (or pictures, or tile groups) may include IDR slices (or pictures, or tile groups) and/or CRA slices (or pictures, or tile groups) and/or broken link access (BLA) slices (or pictures, or tile groups).

5. In one example, if one picture is split into several slice (or tile group), each slice (or tile group) should share the same reshaping model information.

a. In one example, if one picture is split into several slice (or tile group), only the first slice (or tile group) may signal the reshaping model information.

6. The variables used in reshaping should be initialized, manipulated and constrained depending on the bit-depth.

a. In one example, MaxBinIdx=f(BitDepth) where f is a function. For example, MaxBinIdx=4*$2^{(BitDepth-8)}$-1 b. In one example, RspCW[i] shall be in the range of g(BitDepth) to 2*OrgCW-1. For example, RspCW[i] shall be in the range of 8*$2^{(BitDepth-8)}$ to 2*OrgCW-1.

7. In one example, ScaleCoef[i]=InvScaleCoeff[i]=1<<shiftY if RspCW[i] is equal to 0, for i=0, 1, ..., MaxBinIdx.

8. It is proposed that reshape_model_delta_max_bin_idx should be in the range from 0 to MaxBinIdx-reshape_model_min_bin_idx, inclusively.

a. Alternatively, reshape_model_delta_max_bin_idx should be in the range from 0 to MaxBinIdx, inclusively.

b. In one example, reshape_model_delta_max_bin_idx is clipped into the range from 0 to MaxBinIdx-reshape_model_min_bin_idx, inclusively.

c. In one example, reshape_model_delta_max_bin_idx is clipped into the range from 0 to MaxBinIdx inclusively.
d. In one example, reshaper_model_min_bin_idx must be smaller than or equal to reshaper_model_max_bin_idx.
e. In one example, reshaper_model_max_bin_idx is clipped into the range from reshaper_model_min_bin_idx to MaxBinIdx, inclusively.
f. In one example, reshaper_model_min_bin_idx is clipped into the range from 0 to reshaper_model_max_bin_idx, inclusively.
g. One or some of the constrains above may be required by a conforming bit-stream.

9. It is proposed that reshape_model_max_bin_idx is set equal to reshape_model_min_bin_idx+reshape_model_delta_maxmin_bin_idx, where reshape_model_delta_maxmin_bin_idx, which is a unsigned integer, is a syntax element signalled after reshape_model_min_bin_idx.
b. In one example, reshape_model_delta_maxmin_bin_idx should be in the range from 0 to MaxBinIdx-reshape_model_min_bin_idx, inclusively.
c. In one example, reshape_model_delta_maxmin_bin_idx should be in the range from 1 to MaxBinIdx-reshape_model_min_bin_idx, inclusively.
d. In one example, reshape_model_delta_maxmin_bin_idx should be clipped to the range from 0 to MaxBinIdx-reshape_model_min_bin_idx, inclusively.
e. In one example, reshape_model_delta_maxmin_bin_idx should be clipped to the range from 1 to MaxBinIdx-reshape_model_min_bin_idx, inclusively.
f. One or some of the constrains above may be required by a conforming bit-stream.

10. It is proposed that reshaper_model_bin_delta_abs_cw_prec_minus1 should be smaller than a threshold T.
a. In one example, T may be a fixed number such as 6 or 7.
b. In one example, T may depend on the bit depth.
c. The constrains above may be required by a conforming bit-stream.

11. It is proposed that RspCW[i] may be predicted by RspCW[i −1], i.e. RspCW[i]=RspCW[i −1]+RspDeltaCW[i].
a. In one example, RspCW[i] may be predicted by RspCW[i −1] when reshaper_model_min_bin_idx<=i<=reshaper_model_max_bin_idx.
b. In one example, RspCW[i] is predicted by OrgCW, i.e. RspCW[i]=OrgCW+RspDeltaCW[i] when i is equal to 0.
c. In one example, RspCW[i] is predicted by OrgCW, i.e. RspCW[i]=OrgCW+RspDeltaCW[i] when i is equal to reshaper_model_min_bin_idx.

12. It is proposed that reshape_model_bin_delta_sign_CW[i] is never signaled and RspDeltaCW[i]=reshape_model_bin_delta_abs_CW[i] is always a positive number.
a. In one example, RspCW[i]=MinV+RspDeltaCW[i].
i. In one example, MinV=32;
ii. In one example, MinV=g(BitDepth). For example, MinV=$8*2^{(BitDepth-8)}$.

13. The calculation of invAvgLuma may depend of the color format.
a. In one example, invAvgLuma=Clip1$_Y$(($\Sigma_i\Sigma_j$ predMapSamples[(xCurr<<scaleX)+i][(yCurr<<scaleY)+j]+((nCurrSw<<scaleX)*(nCurrSh<<scaleY)>>1))/((nCurrSw<<scaleX)*(nCurrSh<<scaleY)))
i. scaleX=scaleY=1 for 4:2:0 format;
ii. scaleX=scaleY=0 for 4:4:4 format;
iii. scaleX=1and scaleY=0 for 4:2:2 format.

14. It is proposed that clipping in the picture inverse mapping process may consider the upper bound and lower bound separately.
a. In one example, invLumaSample=Clip3(minVal, maxVal, invLumaSample), minVal, maxVal are calculated following different conditions.
i. For example, minVal=T1<<(BitDepth−8) if reshape_model_min_bin_idx>0; Otherwise, minVal=0; e.g. T1=16.
ii. For example, maxVal=T2<<(BitDepth−8) if reshape_model_max_bin_idx<MaxBinIdx; Otherwise, maxVal=(1<<BitDepth)−1; e.g. T2=235. In another example, T2=40.

15. It is proposed that ReshapePivot[i] should be constrained as ReshapePivot[i]<=T. e.g. T=(1<<BitDepth)−1.
a. For example, ReshapePivot[i+1]=min(ReshapePivot[i]+RspCW[i], T).

16. Instead of reshaping each pixel domain residual value for chroma components, a chroma QP offset (denoted as dChromaQp) may be derived implicitly for each block or TU, and it may be added to the chroma QP. In this way, reshaping of chroma components is merged into quantization/de-quantization process.
a. In one example, dChromaQp may be derived based on a representative luma value, denoted as repLumaVal.
b. In one example, repLumaVal may be derived using partial or all luma prediction value of the block or TU.
c. In one example, repLumaVal may be derived using partial or all luma reconstructed value of the block or TU.
d. In one example, repLumaVal may be derived as average of partial or all luma prediction or reconstructed value of the block or TU.
e. Suppose ReshapePivot[idx]<=repLumaVal<ReshapePivot[idx+1], then InvScaleCoeff[idx] may be used to derive dChromaQp.
i. In one example, dQp may be selected as argmin abs(2^(x/6+shiftY)−InvScaleCoeff[idx]), x=−N . . . , M. For example, N=M=63.
ii. In one example, dQp may be selected as argmin abs(1−(2^(x/6+shiftY)/InvScaleCoeff[idx])), x=−N . . . , M. For example, N=M=63.
iii. In one example, for different InvScaleCoeff[idx] value, the dChromaQp may be precalculated and stored in a lookup table.

17. Instead of reshaping each pixel domain residual value for luma components, a luma QP offset (denoted as dQp) may be derived implicitly for each block and may be added to the luma QP. In this way, reshaping of luma component is merged into quantization/de-quantization process.
a. In one example, dQp may be derived based on a representative luma value, denoted as repLumaVal.
b. In one example, repLumaVal may be derived using partial or all luma prediction value of the block or TU.

c. In one example, repLumaVal may be derived as average of partial or all luma prediction value of the block or TU.
d. Suppose idx=repLumaVal/OrgCW, then InvScaleCoeff[idx] may be used to derive dQp.
  i. In one example, dQp may be selected as argmin abs($2^{(x/6+shiftY)}$−InvScaleCoeff[idx]), x=−N . . . , M. For example, N=M=63.
  ii. In one example, dQp may be selected as argmin abs(1−($2^{(x/6+shiftY)}$/InvScaleCoeff[idx])), x=−N . . . , M. For example, N=M=63.
  iii. In one example, for different InvScaleCoeff[idx] value, the dQp may be precalculated and stored in a lookup table.
  In this case, dChromaQp may be set equal to dQp.

5. Example Implementations of the Disclosed Technology

Figure 27A:
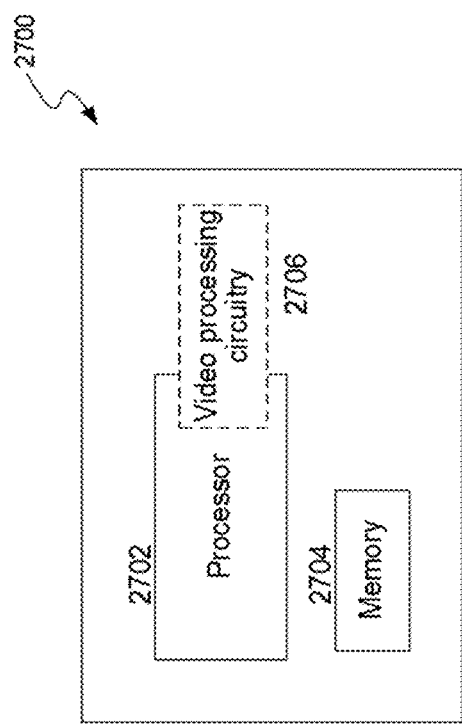
FIGS. 27A and 27B are block diagrams of examples of a hardware platform for implementing a visual media processing described in the present document.

FIG. 27A is a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods described in the present document. The memory (memories) 2704 may be used for storing data and code used for implementing the methods and techniques described herein. The video processing hardware 2706 may be used to implement, in hardware circuitry, some techniques described in the present document, and may be partly or completely be a part of the processors 2702 (e.g., graphics processor core GPU or other signal processing circuitry).

Figure 27B:
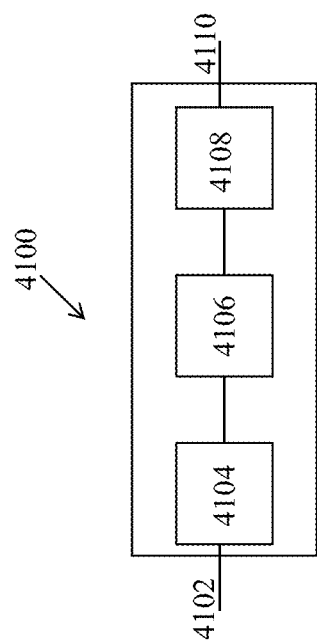

FIG. 27B is another example of a block diagram of a video processing system in which disclosed techniques may be implemented. FIG. 27B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 28A:
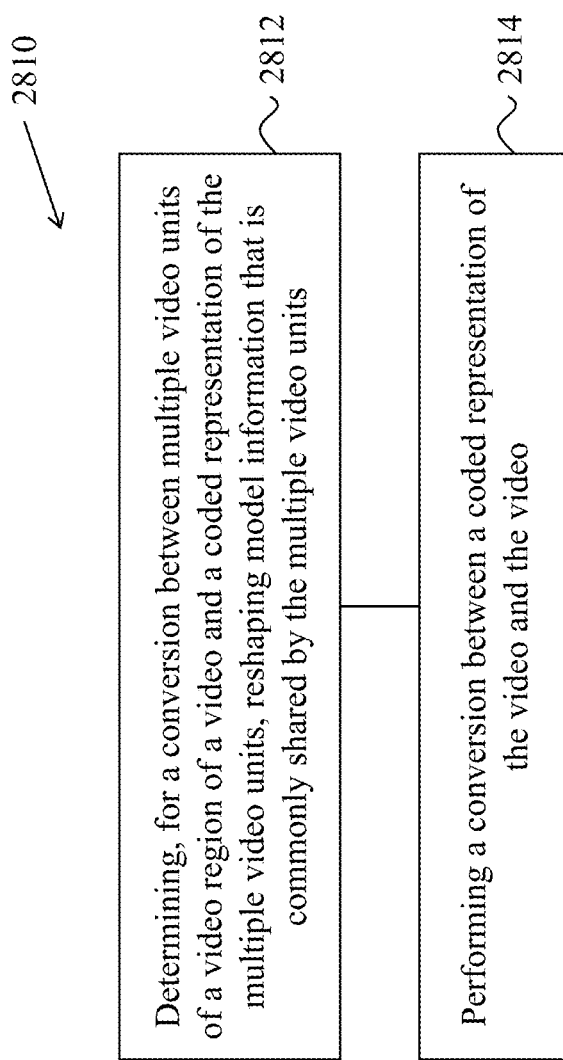
FIGS. 28A to 28E show flowcharts of example methods for video processing based on some implementations of the disclosed technology.

FIG. 28A is a flowchart for an example method 2810 of video processing. The method 2810 includes, at step 2812, determining, for a conversion between multiple video units of a video region of a video and a coded representation of the multiple video units, reshaping model information that is commonly shared by the multiple video units. The method 2810 further includes, at step 2814, performing a conversion between a coded representation of the video and the video.

Figure 28B:
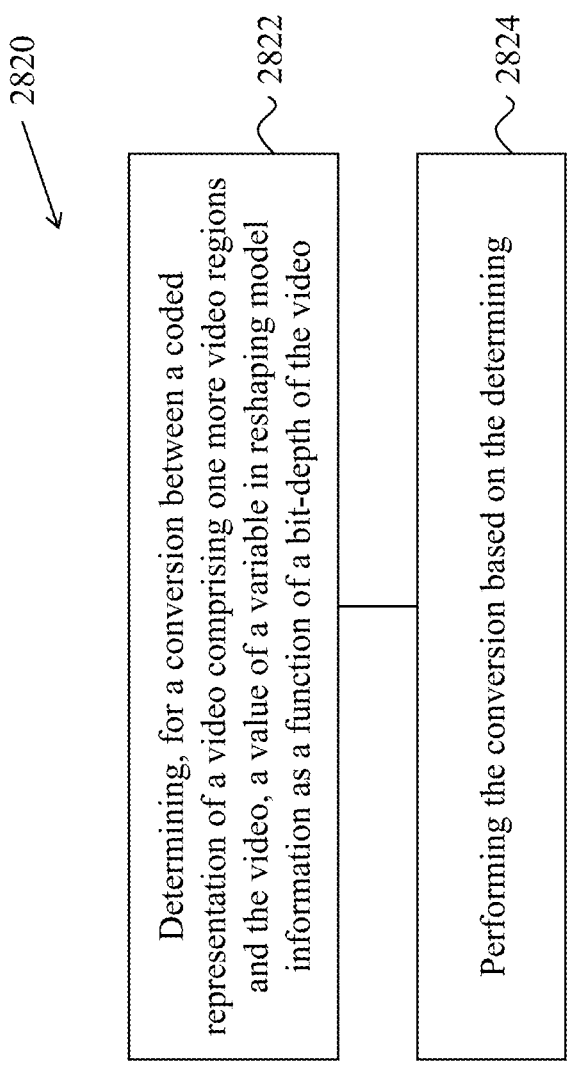

FIG. 28B is a flowchart for an example method 2820 of video processing. The method 2820 includes, at step 2822, determining, for a conversion between a coded representation of a video comprising one more video regions and the video, a value of a variable in reshaping model information as a function of a bit-depth of the video. The method 2820 further includes, at step 2824, performing the conversion based on the determining.

Figure 28C:
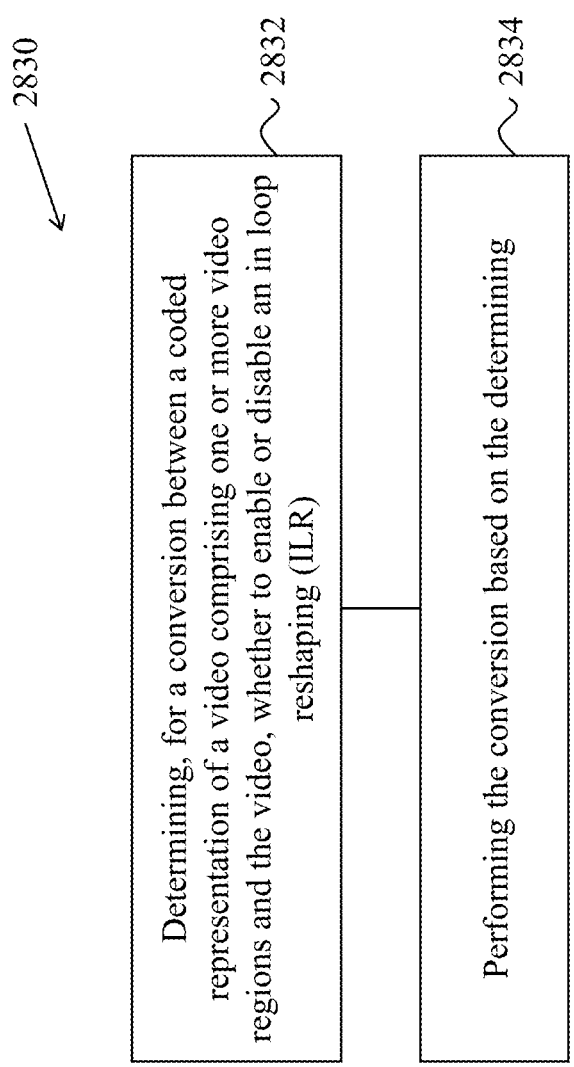

FIG. 28C is a flowchart for an example method 2830 of video processing. The method 2830 includes, at step 2832, determining, for a conversion between a coded representation of a video comprising one or more video regions and the video, whether to enable or disable an in loop reshaping (ILR). The method 2830 further includes, at step 2834, performing the conversion based on the determining. In some implementations, the determining determines to disable the ILR in a case that the reshaping model information is not initialized.

Figure 28D:
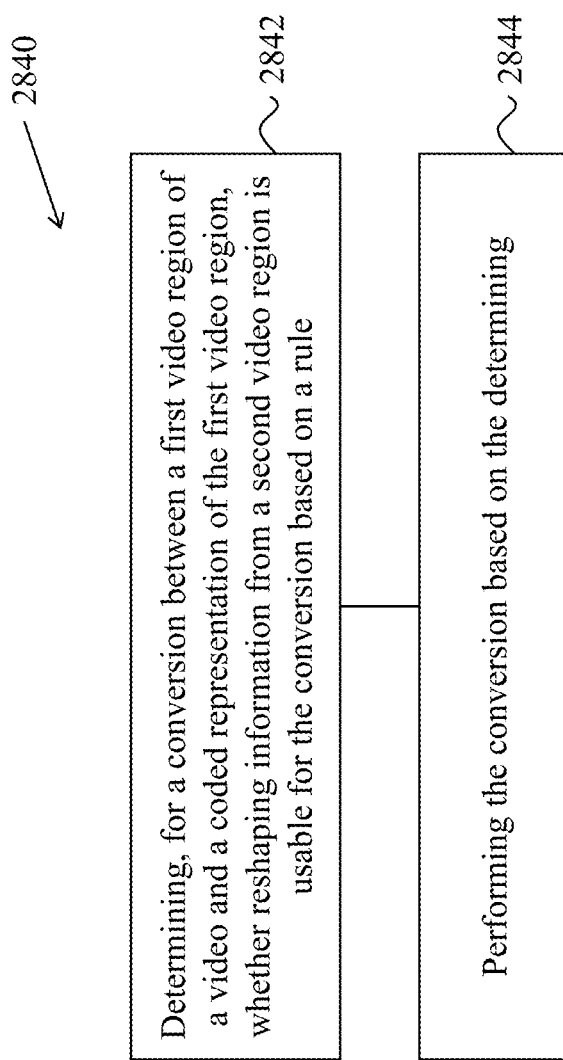

FIG. 28D is a flowchart for an example method 2840 of video processing. The method 2840 includes, at step 2842, determining, for a conversion between a first video region of a video and a coded representation of the first video region, whether reshaping information from a second video region is usable for the conversion based on a rule. The method

2840 further includes, at step 2844, performing the conversion according to the determining.

Figure 28E:
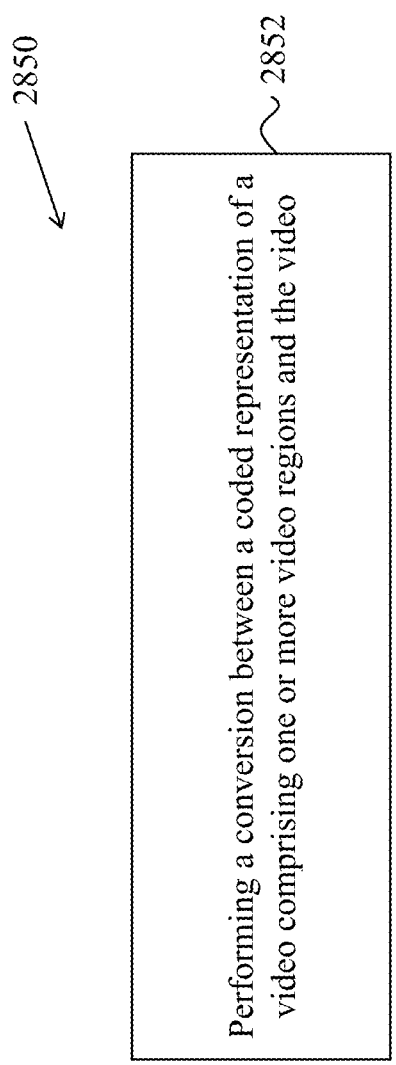

FIG. 28E is a flowchart for an example method 2850 of video processing. The method 2850 includes, at step 2852, performing a conversion between a coded representation of a video comprising one or more video regions and the video. In some implementations, the coded representation includes reshaping model information applicable for in-loop reshaping (ILR) of some of the one or more video regions. In some implementations, the reshaping model information provides information for a reconstruction of a video unit of a video region based on a representation of the video unit in a first domain and a second domain and/or scaling chroma residue of a chroma video unit. In some implementations, the reshaping model information has been initialized based on an initialization rule. In some implementations, the reshaping model information is included in the coded representation only if the video region is coded using a specific coding type. In some implementations, the conversion is performed between a current video region of the video and the coded representation of the current video region such that the current video region is coded using a specific coding type, wherein the coded representation conforms to a format rule that specifies to reshaping model information in the coded representation conditionally based on a value of a flag in the coded representation at a video region level.

In some implementations, the reshaping model information provides information for a reconstruction of a video unit of a video region based on a representation in a first domain and a second domain and/or scaling chroma residue of a chroma video unit. In some implementations, the reshaping model information comprises a parameter set that comprises a syntax element specifying a difference between an allowed maximum bin index and a maximum bin index to be used in the reconstruction, and wherein the parameter is in a range. In some implementations, the reshaping model information comprises a parameter set that comprises a maximum bin index to be used in the reconstruction, and wherein the maximum bin index is derived as a first value equal to a sum of a minimum bin index to be used in the reconstruction and a syntax element that is an unsigned integer and signaled after the minimum bin index.

In some implementations, the reshaping model information comprises a parameter set that includes a first syntax element that derives a number of bits used to represent a second syntax element specifying an absolute delta codeword value from a corresponding bin, and the first syntax element has a value smaller than a threshold. In some implementations, the reshaping model information comprises a parameter set that includes an i-th parameter that represents a slope of an i-th bin used in the ILR and has a value based on an (i−1)th parameter, i being a positive integer. In some implementations, the reshaping model information used for the ILR comprises a parameter set that includes reshape_model_bin_delta_sign_CW[i] that is not signaled and RspDeltaCW[i]=reshape_model_bin_delta_abs_CW[i] is always a positive number. In some implementations, the reshaping model information comprises a parameter set that includes a parameter, invAvgLuma, for using luma values for the scaling depending on a color format of the video region. In some implementations, the conversion includes a picture inverse mapping process to transform reconstructed picture luma samples to modified reconstructed picture luma samples, and the picture inverse mapping process includes clipping in which an upper bound and a lower bound are set separately from each other. In some implementations, the reshaping model information comprises a parameter set that includes a pivot quantity constrained such that Pivot[i]<=T. In some implementations, a chroma quantization parameter (QP) has an offset whose value is derived for each block or transform unit. In some implementations, a luma quantization parameter (QP) has an offset whose value is derived for each block or transform unit.

Various techniques and embodiments may be described using the following clause-based format.

The first set of clauses describe certain features and aspects of the disclosed techniques listed in the previous section.

1. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step.

2. The method of clause 1, wherein the decoding step relates to an I-slice, a picture, or a tile group.

3. The method of clause 1, wherein the decoding step relates to an instantaneous decoding refresh (IDR) slice, picture, or tile group.

4. The method of clause 1, wherein the decoding step relates to a clean random access (CRA) slice, picture, or tile group.

5. The method of clause 1, wherein the decoding step relates to an intra random access point (I-RAP) slice, picture, or tile group.

6. The method of clause 1, wherein the I-RAP slice, picture, or tile group can include one or more of: a IDR slice, picture, or tile group, a CRA slice, picture, or tile group, or a broken link access (BLA) slice, picture, or tile group.

7. The method of any one or more of clauses 1-6, wherein the initialization step occurs prior to the decoding step.

8. The method of any one or more of clauses 1-7, wherein the initialization step includes setting a OrgCW quantity as (1<<BitDepthY)/(MaxBinIdx+1). ReshapePivot[i]=InputPivot[i]=i*OrgCW, for i=0, 1, . . . , MaxBinIdx, wherein OrgCW, BitDepthY, MaxBinIdx, and ReshapePivot are quantities associated with the reshaping model information.

9. The method of any one or more of clauses 1-7, wherein the initialization step includes setting a quantity as ScaleCoef[i]=InvScaleCoeff[i]=1<<shiftY, for i=0, 1, . . . , MaxBinIdx, wherein ScaleCoef, InvScaleCoeff, and shiftY are quantities associated with the reshaping model information.

10. The method of any one or more of clauses 1-7, wherein the initialization step includes setting a OrgCW quantity as (1<<BitDepthY)/(MaxBinIdx+1). RspCW[i]=OrgCW for i=0, 1, . . . , MaxBinIdx, a. OrgCW is set equal to (1<<BitDepthY)/(MaxBinIdx+1). RspCW[i]=OrgCW, for i=0, 1, . . . , MaxBinIdx, wherein OrgCW, BitDepthY, MaxBinIdx, and RspCW are quantities associated with the reshaping model information.

11. The method of clause 1, wherein the initialization step includes setting the reshaping model information to default values, and wherein the signaling step includes signaling the default values included in a sequence parameter set (SPS) or a picture parameter set (PPS).

12. The method of clause 1, further comprising: upon determining that the reshaping model information is not initialized during the initialization step, disabling the in-loop reshaping step.

13. The method of clause 1, wherein, during the signaling step, the reshaping model information is signaled in any of: an I-slice, picture, or tile group, an IDR slice, picture, or tile group, an intra random access point (I-RAP) slice, picture, or tile group.

14. The method of clause 1, wherein the I-RAP slice, picture, or tile group can include one or more of: a IDR slice, picture, or tile group, a CRA slice, picture, or tile group, or a broken link access (BLA) slice, picture, or tile group.

15. The method of clause 1, wherein the signaling step includes signaling the reshaping model information included in a sequence parameter set (SPS) or a picture parameter set (PPS).

16. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step and disabling utilization of the reshaping model information in a second picture when the reshaping model information is signaled in a first picture.

17. The method of clause 16, further comprising: if an intermediate picture is transmitted after the first picture but before the second picture, disabling utilization of the reshaping model information in the second picture when the reshaping model information is signaled in the first picture.

18. The method of clause 17, wherein the second picture is an I picture, IDR picture, CRA picture, or I-RAP picture.

19. The method of any one or more of clauses 17-18, wherein the intermediate picture is an I picture, IDR picture, CRA picture, or I-RAP picture.

20. The method of any one or more of clauses 16-19, wherein the picture includes a tile or a group.

21. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step and during the signaling step, signaling a flag in a picture such that based on the flag, the reshaping model information is sent in the picture, otherwise the reshaping model information is initialized in the initialization step before the picture is decoded in the decoding step.

22. The method of clause 21, wherein the picture is an I picture, IDR picture, CRA picture, or I-RAP picture.

23. The method of any one or more of clauses 21-22, wherein the picture includes a tile or a group.

24. The method of clause 21, wherein the flag takes a value 0 or 1.

25. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step, and upon splitting a picture into multiple units, the reshaping model information associated with each of the multiple units is same.

26. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step, and upon splitting a picture into multiple units, the reshaping model information is signaled only in a first of the multiple units.

27. The method of any one or more of clauses 25-26, wherein the unit corresponds to a slice or a tile group.

28. A method of visual media processing, comprising: performing a conversion between a current video block and a bitstream representation of the current video block, wherein, during conversion, an in-loop reshaping step is used to transform a representation of the current video block from a first domain to a second domain according to side information associated with the in-loop reshaping step, wherein the in-loop reshaping step is based in part on reshaping model information, and wherein, during conversion, the reshaping model information is utilized in one or more of: an initialization step, a signaling step, or a decoding step, and wherein the reshaping model information is manipulated based on a bit depth value.

29. The method of clause 28, wherein the reshaping model information includes a MaxBinIdx variable that is related to the bit depth value.

30. The method of clause 28, wherein the reshaping model information includes a RspCW variable that is related to the bit depth value.

30. The method of clause 29, wherein the reshaping model information includes a reshape_model_delta_max_bin_idx variable that ranges in values from 0 to the MaxBinIdx variable.

31. The method of clause 29, wherein the reshaping model information includes a reshape_model_delta_max_bin_idx variable that is clipped in a range starting from 0 to a value corresponding to MaxBinIdx−reshape_model_min_bin_idx, wherein reshape_model_min_bin_idx is another variable in the reshaping model information.

32. The method of clause 29, wherein the reshaping model information includes a reshape_model_delta_max_bin_idx variable that is clipped in a range starting from 0 to the MaxBinIdx variable.

33. The method of clause 29, wherein the reshaping model information includes a reshaper_model_min_bin_idx variable and a reshaper_model_delta_max_bin_idx variable, wherein the reshaper_model_min_bin_idx variable is smaller than the reshaper_model_min_bin_idx variable.

34. The method of clause 29, wherein the reshaping model information includes a reshaper_model_min_bin_idx variable and a reshaper_model_delta_max_bin_idx variable, wherein the reshaper_model_max_bin_idx is clipped into a range varying from reshaper_model_min_bin_idx to MaxBinIdx.

35. The method of clause 29, wherein the reshaping model information includes a reshaper_model_min_bin_idx variable and a reshaper_model_delta_max_bin_idx variable, wherein the reshaper_model_min_bin_idx is clipped into a range varying from 0 to reshaper_model_max_bin_idx.

36. The method of clause 29, wherein the reshaping model information includes a reshaper_model_bin_delta_abs_cw_prec_minus1 variable that is smaller than a threshold value.

37. The method of clause 36, wherein the threshold value is a fixed number.

38. The method of clause 36, wherein the threshold value is based on the bit depth value.

39. The method of clause 28, wherein the reshaping model information includes a invAvgLuma variable calculated as invAvgLuma=Clip1Y((□i□j predMapSamples [(xCurr<<scaleX)+i][(yCurr<<scaleY)+j]
+((nCurrSw<<scaleX)*(nCurrSh<<scaleY)>>1))/
((nCurrSw<<scaleX)*(nCurrSh<<scaleY))).

40. The method of clause 28, wherein scaleX=scaleY=1 for 4:2:0 format.

41 The method of clause 28, wherein scaleX=scaleY=1 for 4:4:4 format.

42. The method of clause 28, wherein scaleX=1 and scaleY=0 for 4:2:2 format.

43. The method of clause 28, wherein the reshaping model information includes a invLumaSample variable calculated as invLumaSample=Clip3(minVal, maxVal, invLumaSample).

44. The method of clause 43, wherein minVal=T1<<(BitDepth−8) if reshape_model_min_bin_idx>0, otherwise, minVal=0.

45. The method of clause 43, wherein maxVal=T2<<(BitDepth−8) if reshape_model max bin idx<MaxBinIdx, otherwise, maxVal=(1<<BitDepth)−1.

46. The method of clause 44, wherein T1=16.

47. The method of clause 45, wherein T2 takes the value 235 or 40.

48. The method of clause 28, wherein the reshaping model information includes a ReshapePivot quantity constrained in a manner such that ReshapePivot[i]<=T.

49. The method of clause 48, wherein T can be calculated as T=(1<<BitDepth)−1, wherein BitDepth corresponds to the bit depth value.

50. The method of any one or more of clauses 1 through 49, wherein the video processing is an encoder-side implementation.

51. The method of any one or more of clauses 1 through 49, wherein the video processing is a decoder-side implementation.

52. An apparatus in a video system comprising a processor and a non-transitory memory with instructions thereon, wherein the instructions upon execution by the processor, cause the processor to implement the method in any one or more of clauses 1 to 49.

53. A computer program product stored on a non-transitory computer readable media, the computer program product including program code for carrying out the method in any one or more of clauses 1 to 49.

The second set of clauses describe certain features and aspects of the disclosed techniques listed in the previous section, including, for example, Example 1 to 7.

1. A video processing method, comprising: determining, for a conversion between multiple video units of a video region of a video and a coded representation of the multiple video units, reshaping model information that is commonly shared by the multiple video units; and performing a conversion between a coded representation of the video and the video, wherein, the reshaping model information provides information for constructing video samples in a first domain and a second domain and/or scaling chroma residue of a chroma video unit.

2. The method of clause 1, wherein the multiple video units correspond to multiple slices or multiple tile groups.

3. The method of clause 2, wherein the multiple video units are associated with same one picture.

4. The method of clause 1, wherein the reshaping model information is present in the coded representation of the multiple video units only once.

5. A video processing method, comprising: determining, for a conversion between a coded representation of a video comprising one more video regions and the video, a value of a variable in reshaping model information as a function of a bit-depth of the video, and performing the conversion based on the determining, wherein the reshaping information is applicable for in-loop reshaping (ILR) of some of the one or more video regions, and wherein the reshaping information provides information for a reconstruction of a video unit of a video region based on a representation in a first domain and a second domain and/or scaling chroma residue of a chroma video unit.

6. The method of clause 5, wherein the variable includes a MaxBinIdx variable that is related to the bit depth value.

7. The method of clause 5, wherein the variable includes a RspCW variable that is related to the bit depth value.

8. The method of clause 7, wherein the variable RspCW is used to derive a variable ReshapePivot which is used to derive a reconstruction of a video unit of a video region.

9. The method of clause 5, wherein the variable includes a InvScaleCoef[i] that satisfies InvScaleCoeff[i]=1<<shiftY, if RspCW[i] is equal to 0 for i that is in a range from 0 to MaxBinIdx, wherein shiftY is an integer representing the precision.

10. The method of clause 9, wherein shifty is 11 or 14.

11. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation of the video unit in a first domain and a second domain and/or scaling chroma residue of a chroma video unit, and wherein the reshaping model information has been initialized based on an initialization rule.

12. The method of clause 11, wherein the initialization of the reshaping model information occurs prior to decoding a sequence of the video.

13. The method of clause 11, wherein the initialization of the reshaping model information occurs prior to decoding at least one of i) a video region coded using an Intra (I) coding type, ii) a video region coded using an instantaneous decoding refresh (IDR) coding type, iii) a video region coded using a clean random access (CRA) coding type, or iv) a video region coded using an intra random access point (I-RAP) coding type.

14. The method of clause 13, wherein the video region coded using the intra random access point (I-RAP) includes at least one of i) the video region coded using an instantaneous decoding refresh (IDR) coding type, ii) the video region coded using a clean random access (CRA) coding type, and/or iii) the video region coded using a broken link access (BLA) coding type.

15. The method of clause 11, wherein the initialization of the reshaping model information includes setting a OrgCW quantity as $(1<<\text{BitDepth}_Y)/(\text{MaxBinIdx}+1)$. ReshapePivot[i]=InputPivot[i]=i*OrgCW, for i=0, 1, . . . , MaxBinIdx, wherein OrgCW, $\text{BitDepth}_Y$, MaxBinIdx, and ReshapePivot are quantities associated with the reshaping model information.

16. The method of clause 11, wherein the initialization of the reshaping model information includes setting a quantity as ScaleCoef[i]=InvScaleCoeff[i]=1<<shiftY, for i=0, 1, . . . , MaxBinIdx, wherein ScaleCoef, InvScaleCoeff, and shiftY are quantities associated with the reshaping model information.

17. The method of clause 11, wherein the initialization of the reshaping model information includes setting a OrgCW quantity as $(1<<\text{BitDepth}_Y)/(\text{MaxBinIdx}+1)$. RspCW[i]=OrgCW for i=0, 1, . . . , MaxBinIdx, a. OrgCW is set equal to (1<<BitDepthY)/(MaxBinIdx+1). RspCW[i]=OrgCW, for i=0, 1, . . . , MaxBinIdx, wherein OrgCW, BitDepthY, MaxBinIdx, and RspCW are quantities associated with the reshaping model information.

18. The method of clause 11, wherein the initialization of the reshaping model information includes setting the reshaping model information to default values, and wherein the default values are included in a sequence parameter set (SPS) or a picture parameter set (PPS).

19. A video processing method, comprising: determining, for a conversion between a coded representation of a video comprising one or more video regions and the video, whether to enable or disable an in loop reshaping (ILR); and performing the conversion based on the determining, and wherein the coded representation includes reshaping model information applicable for the ILR of some of one or more video regions, and wherein the reshaping model information provides information for a reconstruction of a video region based on a first domain and a second domain and/or scaling chroma residue of a chroma video unit, and wherein the determining determines to disable the ILR in a case that the reshaping model information is not initialized.

20. A video processing method, comprising: performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a first domain and a second domain and/or scaling chroma residue of a chroma video unit, wherein the reshaping model information is included in the coded representation only if the video region is coded using a specific coding type.

21. The method of clause 20, wherein the video region is a slice or a picture or a tile group and wherein the specific coding type is an Intra (I) coding type.

22. The method of clause 20, wherein the video region is a slice or a picture or a tile group, and wherein the specific coding type is an instantaneous decoding refresh (IDR) coding type.

23. The method of clause 20, wherein the video region is a slice or a picture or a tile group, and wherein the specific coding type is a clean random access (CRA) coding type.

24. The method of clause 20, wherein the video region is a slice or a picture or a tile group, and wherein the specific coding type is an intra random access point (I-RAP) coding type.

25. The method of clause 24, wherein the intervening video region coded using the intra random access point (I-RAP) coding type includes at least one of i) the video region coded using an instantaneous decoding refresh (IDR) coding type, ii) the video region coded using a clean random access (CRA) coding type, and/or iii) the video region coded using a broken link access (BLA) coding type.

26. The method of clause 20, wherein the reshaping model information is included in a sequence level, a picture level, or an adaptation parameter set (APS).

27. A video processing method, comprising: determining, for a conversion between a first video region of a video and a coded representation of the first video region, whether reshaping information from a second video region is usable for the conversion based on a rule; and performing the conversion according to the determining.

28. The method of clause 27, wherein the reshaping information is used for a reconstruction of a video unit of a video region based on a first domain and a second domain and/or scaling chroma residue of a chroma video unit.

29. The method of clause 27, wherein the rule disallows use of the reshaping model information by the first video region in a case that the coded representation includes an intervening video region coded using a particular coding type between the first video region and the second video region.

30. The method of clause 29, wherein the intervening video region is coded using an Intra (I) coding type.

31. Th method of any of clauses 29-30, wherein the intervening video region is coded using an instantaneous decoding refresh (IDR) coding type.

32. The method of any of clauses 29-31, wherein the intervening video region is coded using a clean random access (CRA) coding type.

33. The method of any of clauses 29-32, wherein the intervening video region is coded using an intra random access point (I-RAP) coding type.

34. The method of clause 33, wherein the intervening video region coded using the intra random access point (I-RAP) coding type includes at least one of i) the video region coded using an instantaneous decoding refresh (IDR) coding type, ii) the video region coded using a clean random access (CRA) coding type, and/or iii) the video region coded using a broken link access (BLA) coding type.

35. The method of any of clauses 27-34, wherein the first video region, the second video region, and/or the intervening video region correspond to slices.

36. The method of any of clauses 27-35, wherein the first video region, the second video region, and/or the intervening video region correspond to pictures.

37. The method of any of clauses 27-36, wherein the first video region, the second video region, and/or the intervening video region correspond to tile groups.

38. A video processing method, comprising: performing a conversion between a current video region of a video and a coded representation of the current video region such that the current video region is coded using a specific coding type, wherein the coded representation conforms to a format rule that specifies to reshaping model information in the coded representation conditionally based on a value of a flag in the coded representation at a video region level.

39. The method of clause 38, wherein the reshaping model information provides information for a reconstruction of a video unit of a video region based on a first domain and a second domain and/or scaling chroma residue of a chroma video unit.

40. The method of clause 38, wherein, in a case that the value of the flag has a first value, the reshaping model information is signaled in the video region and otherwise the reshaping model information is initialized before decoding the video region.

41. The method of clause 38, wherein the first value is 0 or 1.

42. The method of clause 38, wherein the video region is a slice or a picture or a tile group and the specific coding type is an Intra (I) coding type.

43. The method of clause 38, wherein the video region is a slice or a picture or a tile group and the specific coding type is an instantaneous decoding refresh (IDR) coding type.

44. The method of clause 38, wherein the video region is a slice or a picture or a tile group and the specific coding type is a clean random access (CRA) coding type.

45. The method of clause 38, wherein the video region is a slice or a picture or a tile group and the specific coding type is an intra random access point (I-RAP) coding type.

46. The method of clause 45, wherein the video region coded using the intra random access point (I-RAP) includes at least one of i) the video region coded using an instantaneous decoding refresh (IDR) coding type, ii) the video region coded using a clean random access (CRA) coding type, and/or iii) the video region coded using a broken link access (BLA) coding type.

47. The method of any of clauses 1-46, wherein the performing of the conversion includes generating the video from the coded representation.

48. An apparatus in a video system comprising a processor and a non-transitory memory with instructions thereon, wherein the instructions upon execution by the processor, cause the processor to implement the method in any one of clauses 1 to 47.

49. A computer program product stored on a non-transitory computer readable media, the computer program product including program code for carrying out the method in any one of clauses 1 to 47.

The third set of clauses describe certain features and aspects of the disclosed techniques listed in the previous section, including, for example, Examples 8 and 9.

1. A video processing method, comprising: performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that comprises a syntax element specifying a difference between an allowed maximum bin index and a maximum bin index to be used in the reconstruction, and wherein the parameter is in a range.

2. The method of clause 1, wherein the syntax element is in the range from 0 to a difference between the allowed maximum bin index and a minimum bin index to be used in the reconstruction.

3. The method of clause 1, wherein the syntax element is in the range from 0 to the allowed maximum bin index.

4. The method of any of clauses 1-3, wherein the allowed maximum bin index is equal to 15.

5. The method of clause 1 or 4, wherein the syntax element has been clipped into the range.

6. The method of clause 1, wherein the minimum bin index is equal to or smaller than the maximum bin index.

7. The method of clause 1, wherein the maximum bin index has been clipped into a range from the minimum bin index to the allowed maximum bin index.

8. The method of clause 1, wherein the minimum bin index has been clipped into a range from 0 to the maximum bin index.

9. A video processing method, comprising: performing a conversion between a coded representation of a video comprising one or more video regions and the video, wherein the coded representation includes reshaping model information applicable for in loop reshaping (ILR) of some of the one or more video regions, wherein the reshaping model information provides information for a reconstruction of a video unit of a video region based on a representation in a first domain and a second domain and/or scaling chroma residue of a chroma video unit, wherein the reshaping model information comprises a parameter set that comprises a maximum bin index to be used in the reconstruction, and wherein the maximum bin index is derived as a first value equal to a sum of a minimum bin index to be used in the reconstruction and a syntax element that is an unsigned integer and signaled after the minimum bin index.

10. The method of clause 9, wherein the syntax element specifies a difference between the maximum bin index and an allowed maximum bin index.

11. The method of clause 10, wherein the syntax element is in a range from 0 to a second value that is equal to a difference between the allowed maximum bin and the minimum bin index.

12. The method of clause 10, wherein the syntax element is in a range from 1 to a second value that is equal to a difference between the minimum bin index and the allowed maximum bin.

13. The method of clause 11 or 12, wherein the syntax element has been clipped to the range.

14. The method of clause 9, wherein syntax elements of the parameter set are within the required range in a conformance bitstream.

15. The method of any of clauses 1 to 14, wherein the performing of the conversion includes generating the video from the coded representation.

16. An apparatus in a video system comprising a processor and a non-transitory memory with instructions thereon, wherein the instructions upon execution by the processor, cause the processor to implement the method in any one of clauses 1 to 15.

17. A computer program product stored on a non-transitory computer readable media, the computer program product including program code for carrying out the method in any one of clauses 1 to 15.

The fourth set of clauses describe certain features and aspects of the disclosed techniques listed in the previous section, including, for example, Examples 10-17.

1. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a first syntax element that derives a number of bits used to represent a second syntax element specifying an absolute delta codeword value from a corresponding bin, and wherein the first syntax element has a value smaller than a threshold.

2. The method of clause 1, wherein the first syntax element specifies a difference between the number of bits used to represent the second syntax element and 1.

3. The method of clause 1, wherein the threshold has a fixed value.

4. The method of clause 1, wherein the threshold has a variable whose value depends on a bit depth.

5. The method of clause 4, wherein the threshold is BitDepth−1, wherein BitDepth represents the bit depth.

6. The method of clause 1, wherein the first syntax element is in a conformance bitstream.

7. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes an i-th parameter that represents a slope of an i-th bin used in the ILR and has a value based on an (i−1)th parameter, i being a positive integer.

8. The method of clause 7, wherein the i-th parameter is predicted from the (i−1)th parameter for a case of reshaper_model_min_bin_idx<=i<=reshaper_model_max_bin_idx. The reshaper_model_min_bin_idx and reshaper_model_max_bin_index indicating a minimum bin index and a maxim bin index that are used in the construction.

9. The method of clause 7, wherein the ith parameter is predicted from OrgCW for i that is equal to 0.

10. The method of clause 7, wherein the ith parameter is predicted from another parameter for i that is equal to a value of reshaper_model_min_bin_idx indicating a minimum bin index used in the construction.

11. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and, wherein the reshaping model information used for the ILR comprises a parameter set that includes reshape_model_bin_delta_sign_CW[i] that is not signaled and RspDeltaCW[i] reshape_model_bin_delta_abs_CW[i] is always a positive number.

12. The method of clause 11, wherein a variable, CW[i], is calculated as a sum of MinV and RspDeltaCW[i].

13. The method of clause 12, wherein MinV is 32 or g(BitDepth), BitDepth corresponding to a bit depth value.

14. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a parameter, invAvgLuma, for using luma values for the scaling depending on a color format of the video region.

15. The method of clause 14, wherein the invAvgLuma is calculated as invAvgLuma=$(\Sigma_i \Sigma j_{predMapSamples}[(xCurr<<scaleX)+i][(yCurr<<scaleY)+j]+(cnt>>1))/cnt$, wherein predMapSamples represents reconstructed luma samples, (xCurrY, yCurrY) represents a top-left chroma sample of a current chroma transform block relative to a top-left chroma sample of a current picture, (i, j) represents a position relative to the top-left chroma sample of the current chroma transform block of a luma sample involved to derive the invAvgLuma, and cnt represents a number of luma samples involved to derive the invAvgLuma.

16. The method of clause 15, wherein scaleX=scaleY=1 for 4:2:0 format.

17. The method of clause 15, wherein scaleX=scaleY=0 for 4:4:4 format.

18. The method of clause 15, wherein scaleX=1 and scaleY=0 for 4:2:2 format.

19. A video processing method, comprising: performing a conversion between a current video block of a video and a coded representation of the video, wherein the conversion includes a picture inverse mapping process to transform reconstructed picture luma samples to modified reconstructed picture luma samples, wherein the picture inverse mapping process includes clipping in which an upper bound and a lower bound are set separately from each other.

20. The method of clause 19, wherein the modified reconstructed picture luma samples include a value invLumaSample that is calculated as invLumaSample=Clip3(minVal, maxVal, invLumaS ample), minVal, maxVal.

21. The method of clause 20, wherein minVal=T1<<(BitDepth−8) in a case that a minimum bin index to be used in the construction is greater than 0 and otherwise minVal=0.

22. The method of clause 20, wherein maxVal=T2<<(BitDepth−8) in a case that a maximum bin index to be used in the construction is smaller than an allowed maximum bin index and otherwise maxVal=(1<<BitDepth)−1, BitDepth corresponding to a bit depth value.

23. A video processing method, comprising: performing a conversion between a coded representation of a video comprising one or more video regions and the video, wherein the coded representation includes reshaping model information applicable for in-loop reshaping (ILR) of some of the one or more video regions, wherein the reshaping model information provides information for a reconstruction of a video unit of a video region based on a representation in a first domain and a second domain and/or scaling chroma residue of a chroma video unit, and wherein the reshaping model information comprises a parameter set that includes a pivot quantity constrained such that Pivot[i]<=T.

24. The method of clause 23, wherein T is calculated as T=(1<<BitDepth)−1, wherein BitDepth corresponds to the bit depth value.

25. A video processing method, comprising: performing a conversion between a representation of a video comprising one or more video regions and the video, wherein the coded representation includes information applicable for an in loop reshaping (ILR) and provides parameters for a reconstruction of a video unit of a video region based on a representation in a first domain and a second domain and/or scaling chroma residue of a chroma video unit, and wherein a chroma quantization parameter (QP) has an offset whose value is derived for each block or transform unit.

26. The method of clause 25, wherein the offset is derived based on a representative luma value (repLumaVal).

27. The method of clause 26, wherein the representative luma value is derived using partial or all of luma prediction values of a block or a transform unit.

28. The method of clause 26, wherein the representative luma value is derived using partial or all luma reconstructed values of a block or a transform unit.

29. The method of clause 26, wherein the representative luma value is derived as average of partial or all of luma prediction values or luma reconstructed values of a block or a transform unit.

30. The method of clause 26, wherein ReshapePivot[idx] <=repLumaVal<ReshapePivot[idx+1], and InvScaleCoeff[idx] is used to derive the offset.

31. The method of clause 30, wherein a luma QP offset is selected as argmin abs $(2^{(x/6+shiftY)}-InvScaleCoeff[idx])$, x=-N . . . , M, and N and M being integers.

32. The method of clause 30, wherein a luma QP offset is selected as argmin abs $(1-(2^{(x/6+shiftY)}/InvScaleCoeff[idx]))$, x=-N . . . , M, and N and M being integers.

33. The method of clause 30, wherein, for different InvScaleCoeff[idx] values, the offset is precalculated and stored in a lookup table.

34. A video processing method, comprising: performing a conversion between a representation of a video comprising one or more video regions and the video, wherein the coded representation includes information applicable for an in loop reshaping (ILR) and provides parameters for a reconstruction of a video unit of a video region based on a representation in a first domain and a second domain and/or scaling chroma residue of a chroma video unit, and wherein a luma quantization parameter (QP) has an offset whose value is derived for each block or transform unit.

35. The method of clause 34, wherein the offset is derived based on a representative luma value (repLumaVal).

36. The method of clause 35, wherein the representative luma value is derived using partial or all of luma prediction values of a block or a transform unit.

37. The method of clause 35, wherein the representative luma value is derived as average of partial or all of luma prediction values of a block or a transform unit.

38. The method of clause 35, wherein idx=repLumaVal/OrgCW, and InvScaleCoeff[idx] is used to derive the offset.

39. The method of clause 38, wherein the offset is selected as argmin abs $(2^{(x/6+shiftY)}-InvScaleCoeff[idx])$, x=-N . . . , M, and N and M being integers.

40. The method of clause 38, wherein the offset is selected as argmin abs $(1-(2^{(x/6+shiftY)}/InvScaleCoeff[idx]))$, x=-N . . . , M, and N and M being integers.

41. The method of clause 38, wherein, for different InvScaleCoeff[idx] values, the offset is precalculated and stored in a lookup table.

42. The method of any of clauses 1-41, wherein the performing of the conversion includes generating the video from the coded representation.

43. An apparatus in a video system comprising a processor and a non-transitory memory with instructions thereon, wherein the instructions upon execution by the processor, cause the processor to implement the method in any one of clauses 1 to 42.

44. A computer program product stored on a non-transitory computer readable media, the computer program product including program code for carrying out the method in any one of clauses 1 to 42.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, during a conversion between a current video unit of a video region of a video and a bitstream of the video, that a coding tool is used for the current video unit;
    performing the conversion by using the coding tool during the conversion, in which the current video unit is constructed based on at least one of:
    1) a forward mapping process for a luma component of the current video unit, in which prediction samples of the luma component are converted from an original domain to a reshaped domain;
    2) an inverse mapping process, which is an inverse operation of the forward mapping process, in which reconstructed samples of the luma component of the current video unit in the reshaped domain are converted to the original domain; or
    3) a scaling process, in which residual samples of a chroma component of the current video unit are scaled before being used to reconstruct the chroma component, and
    wherein model information of the coding tool for the current video unit is included in the bitstream, and
    wherein in response to the video region comprising one or more video units including the current video unit, each of the one or more video units share the same model information of the coding tool for the current video unit.

2. The method of claim 1, wherein the one or more video units correspond to one or more slices, one or more tile groups, one or more coding tree units, or one or more coding units.

3. The method of claim 1, wherein the video region is a picture.

4. The method of claim 1, wherein the model of the coding tool includes a piecewise linear model which is used to map the prediction samples of the luma component of the current video unit into particular values during the forward mapping process.

5. The method of claim 4, wherein a value of at least one variable of the piecewise linear model is dependent on a bit depth of the video.

6. The method of claim 4, wherein a range of a value of a code word for an i-th piecewise of the piecewise linear model is dependent on a bit depth of the video, and the code word for the i-th piecewise is associated with the particular values.

7. The method of claim 1, wherein the model information of the coding tool for the current video unit comprises a first syntax element and a second syntax element, the first syntax element specifying a difference between a maximum allowed bin index and a maximum bin index to be used in the forward mapping process, and the second syntax element specifying a minimum bin index to be used in the forward mapping process.

8. The method of claim 7, wherein a value of the first syntax element is in a range from 0 to the maximum allowed bin index.

9. The method of claim 7, wherein a value of the second syntax element is smaller than or equal to the maximum bin index to be used in the forward mapping process.

10. The method of claim 7, wherein a value of the second syntax element is in a range from 0 to the maximum bin index to be used in the forward mapping process.

11. The method of claim 7, wherein the maximum allowed bin index is equal to 15.

12. The method of claim 1, wherein a filtering process is applied on the converted reconstructed samples in the original domain generated in the inverse mapping process.

13. The method of claim 6, wherein the value of the code word for the i-th piecewise is determined based on the model information of the coding tool for the current video unit.

14. The method of claim 1, wherein a usage flag of the coding tool is included in a sequence parameter set.

15. The method of claim 1, wherein the conversion includes encoding the current video block into the bitstream.

16. The method of claim 1, wherein the conversion includes decoding the current video block from the bitstream.

17. An apparatus for processing video data comprising a processor and a non-transitory memory with instructions thereon, wherein the instructions upon execution by the processor, cause the processor to:

determine, during a conversion between a current video unit of a video region of a video and a bitstream of the video, that a coding tool is used for the current video unit;

perform the conversion by using the coding tool during the conversion, in which the current video unit is constructed based on at least one of:
1) a forward mapping process for a luma component of the current video unit, in which prediction samples of the luma component are converted from an original domain to a reshaped domain;
2) an inverse mapping process, which is an inverse operation of the forward mapping process, in which reconstructed samples of the luma component of the current video unit in the reshaped domain are converted to the original domain; or
3) a scaling process, in which residual samples of a chroma component of the current video unit are scaled before being used to reconstruct the chroma component, and wherein model information of the coding tool for the current video unit is included in the bitstream, and wherein in response to the video region comprising one or more video units including the current video unit, each of the one or more video units share the same model information of the coding tool for the current video unit.

18. The apparatus of claim 17, wherein the model information of the coding tool for the current video unit comprises a first syntax element and a second syntax element, the first syntax element specifying a difference between a maximum allowed bin index and a maximum bin index to be used in the forward mapping process, and the second syntax element specifying a minimum bin index to be used in the forward mapping process.

19. A non-transitory computer-readable storage medium storing instructions that cause a processor to:

determine, during a conversion between a current video unit of a video region of a video and a bitstream of the video, that a coding tool is used for the current video unit;

perform the conversion by using the coding tool during the conversion, in which the current video unit is constructed based on at least one of:
1) a forward mapping process for a luma component of the current video unit, in which prediction samples of the luma component are converted from an original domain to a reshaped domain;
2) an inverse mapping process, which is an inverse operation of the forward mapping process, in which reconstructed samples of the luma component of the current video unit in the reshaped domain are converted to the original domain; or
3) a scaling process, in which residual samples of a chroma component of the current video unit are scaled before being used to reconstruct the chroma component, and wherein model information of the coding tool for the current video unit is included in the bitstream, and wherein in response to the video region comprising one or more video units including the current video unit, each of the one or more video units share the same model information of the coding tool for the current video unit.

20. A non-transitory computer-readable recording medium storing a bitstream of a video which is generated by a method performed by a video processing apparatus, wherein the method comprises:

determining, that a coding tool is used for a current video unit of a video region of a video;

generating the bitstream by using the coding tool, in which the current video unit is constructed based on at least one of:
1) a forward mapping process for a luma component of the current video unit, in which prediction samples of the luma component are converted from an original domain to a reshaped domain;
2) an inverse mapping process, which is an inverse operation of the forward mapping process, in which reconstructed samples of the luma component of the current video unit in the reshaped domain are converted to the original domain; or
3) a scaling process, in which residual samples of a chroma component of the current video unit are scaled before being used to reconstruct the chroma component, and wherein model information of the coding tool for the current video unit is included in the bitstream, and wherein in response to the video region comprising one or more video units including the current video unit, each of the one or more video units share the same model information of the coding tool for the current video unit.

* * * * *